US011522785B2

(12) United States Patent
Dhanabalan et al.

(10) Patent No.: US 11,522,785 B2
(45) Date of Patent: Dec. 6, 2022

(54) INTELLIGENT PATH SELECTION SYSTEMS AND METHODS TO REDUCE LATENCY

(71) Applicant: Citrix Systems, Inc., Fort Lauderdale, FL (US)

(72) Inventors: Praveen Raja Dhanabalan, Bangalore (IN); Vladimir Vysotsky, Freemont, CA (US); Saurabh Pant, Bangalore (IN); Srinivasarao Nelluri, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 17/170,271

(22) Filed: Feb. 8, 2021

(65) Prior Publication Data

US 2022/0255839 A1    Aug. 11, 2022

(51) Int. Cl.
*H04L 45/121*    (2022.01)
*H04L 45/42*    (2022.01)
*H04L 67/1097*    (2022.01)
*H04L 9/40*    (2022.01)

(52) U.S. Cl.
CPC ............ *H04L 45/121* (2013.01); *H04L 45/42* (2013.01); *H04L 63/0236* (2013.01); *H04L 63/20* (2013.01); *H04L 67/1097* (2013.01)

(58) Field of Classification Search
CPC ... H04L 45/121; H04L 45/42; H04L 63/0236; H04L 63/20; H04L 67/1097
See application file for complete search history.

(56) References Cited

U.S. PATENT DOCUMENTS

| 7,551,620 | B1 * | 6/2009 | Samuels | H04L 47/34 |
| | | | | 370/394 |
| 7,933,257 | B2 * | 4/2011 | Sutton | H04L 47/10 |
| | | | | 370/351 |
| 9,185,562 | B2 * | 11/2015 | Reddy | H04L 29/06 |
| 9,538,345 | B2 * | 1/2017 | Sah | H04W 28/08 |
| 10,484,266 | B2 * | 11/2019 | Shelar | H04L 45/24 |

(Continued)

OTHER PUBLICATIONS

A. Ford et al. "Request for Comments (RFC) 8684: TCP Extensions for Multipath Operation with Multiple Addresses", Mar. 2020, 68 pages. (Year: 2020).*

(Continued)

*Primary Examiner* — George C Neurauter, Jr.
(74) *Attorney, Agent, or Firm* — Foley & Lardner LLP

(57) ABSTRACT

Described embodiments provide systems and method for intelligent path selection to reduce latency and maintain security. A client can request access to a server and multiple connections can be initiated to the requested destination, for example, a direct connection from a branch office and a backhauled connection through a data center. Traffic via the second connection can be controllable by application of at least one rule of the data center. A device can determine a delay in the exchange of data via the connections and a security level of the connections. The determination of the delay in the exchange of data via the another connection can be based on in part feedback about the application of the rule. The device can connect a client device to a server through one of the connections using the determination of the delay and the security level of the connection.

14 Claims, 8 Drawing Sheets

(56) References Cited

U.S. PATENT DOCUMENTS

| | | | |
|---|---|---|---|
| 2011/0235595 A1* | 9/2011 | Mehta | H04W 8/082 |
| | | | 370/329 |
| 2018/0084006 A1* | 3/2018 | Kwan | H04L 63/0227 |
| 2018/0219885 A1* | 8/2018 | Ahmadzadeh | H04W 12/122 |
| 2018/0262419 A1* | 9/2018 | Ludin | H04L 61/1511 |

OTHER PUBLICATIONS

M. Bagnulo et al. "Analysis of Residual Threats and Possible Fixes for Multipath TCP (MPTCP)", Jul. 2015, 19 pages. (Year: 2015).*
Costin Raiciu et al. "How Hard Can It Be? Designing and Implementing a Deployable Multipath TCP", NSDI'12: Proceedings of the 9th USENIX conference on Networked Systems Design and Implementation, Apr. 2012, 14 pages. (Year: 2014).*
Gregory Detal, Christoph Paasch and Olivier Bonaventure. "Multipath in the Middle(Box)", HotMiddlebox'13, Dec. 9, 2013, Santa Barbara, CA, USA, 6 pages. (Year: 2013).*

* cited by examiner

INTELLIGENT PATH SELECTION SYSTEMS AND METHODS TO REDUCE LATENCY

FIELD OF THE DISCLOSURE

The present application generally relates to connections to servers and intelligent path selection systems and methods to reduce latency.

BACKGROUND

In network environments, a client can access a plurality of resources or applications provided through a plurality of servers. Connections to the servers can be selected based on various network characteristics. A device may monitor and manage the connections between the clients and servers over the network environment.

SUMMARY

Systems and methods for intelligent path selection to reduce latency and maintain security are provided herein. A client can request access to a server or remote computing device and multiple connections can be initiated to the requested destination, for example, a direct connection from a branch office and a backhauled connection through a gateway or data center. The connections can be initiated in parallel and feedback or security settings of the backhauled connection can be applied to the direct connection to determine a security level of the direct connection and make selection of which connection to use to connect the client to the requested server. The device can use firewall settings, rules applied at the data center, certificate comparisons and/or handshake communications performed through the backhauled connection to make a determine the security level of the direct connection and/or detect a security threat of the direct connection. The device can select at least one of the direct connection through the branch office or the backhauled connection through the data center based in part on a latency of the respective connection and the security level of the respective connection. The device can provide an improved performance due to reduced network latency while maintaining a security level of a connection between a client device and a server or remote computing device.

In at least one aspect, a method is provided. The method can include initiating, by a computing device, connections to a plurality of remote computing devices. The connections can include one connection to a first remote computing device and another connection to a second remote computing device. Traffic via the another connection can be controllable by application of at least one rule of a network security system. The method can include determining, by the computing device, a delay in the exchange of data via the connections. The determination of the delay in the exchange of data via the another connection can be based on in part feedback about the application of the at least one rule. The method can include connecting, by the computing device, a client device to one of the plurality of remote computing devices via at least one of the one connection or the another connection based on the determined delay in the exchange of data via the connections.

In embodiments, the at least one rule can include at least one of: a certificate, a firewall setting of the network security system, or a response to a handshake with the second remote computing device. The method can include initiating, by the computing device, the another connection to the second remote computing device responsive to performing a handshake with the first remote computing device. The another connection can have a sequence number associated with a sequence number of the one connection to the first remote computing device. The method can include selecting, by the computing device responsive to a comparison of the delay in the exchange of data of the one connection to the delay in the exchange of data of the another connection, the one connection to the first remote computing device to connect a client device to the first remote computing device. The another connection can be rejected.

In embodiments, the method can include comparing, by the computing device, a certificate communicated through the one connection to a certificate communicated through the another connection. The method can include identifying, by the computing device responsive to a difference between certificates, an attack on the one connection. The method can include selecting, by the computing device, the another connection to connect a client device to the second remote computing device. The method can include identifying, by the computing device, a certificate communicated through the one connection matches a certificate communicated through the another connection. The method can include selecting, by the computing device responsive to the match between certificates, the one connection to connect a client device to the first remote computing device.

The method can include maintaining, by the computing device in a database, a plurality of connection decisions to the plurality of remote computing devices. In embodiments, each connection decision can indicate a remote computing device, certificate associated with the remote computing device and a selected connection. The method can include selecting, by the computing device using the plurality of connection decisions, the one connection to the first remote computing device or the another connection to the second remote computing device for subsequent requests from one or more client devices to one or more remote computing devices of the plurality of remote computing devices. The method can include performing, by the computing device, a handshake with the second remote computing device through the another connection. The method can include rejecting, by the computing device responsive to the handshake through the another connection, the one connection to the first remote computing device.

In at least one aspect, a method is provided. The method can include initiating, by a computing device for a client device, a first connection to a server and a second connection to the server through a data center. The data center can include firewall settings. The method can include transmitting, by the computing device via the data center, data packets through the second connection to verify a security level of the first connection and the second connection. The method can include selecting, by the computing device responsive to the firewall settings of data center, the first connection to communicate traffic from the client device and the server.

In embodiments, the method can include determining, by the computing device, a latency of the first connection is less than a latency of the second connection. The method can include determining, by the computing device, a certificate communicated through the first connection matches a certificate communicated through the second connection. The method can include storing, by the computing device in a database, a connection decision to select the first connection for the server in database of a plurality of connection decisions for a plurality of servers. In embodiments, each connection decision can indicate a server, certificate associated with the server and a selected connection. The method can include receiving, by the computing device from the client device, a request to access the server. The method can include selecting, by the computing device using the connection decision, the first connection to connect the client device to the server.

In at least one aspect, a system is provided. The system can include a computing device comprising one or more processors coupled to memory. The computing device can be configured to initiate connections to a plurality of remote computing devices. The connections can include one connection to a first remote computing device and another connection to a second remote computing device. The traffic via the another connection can be controllable by application of at least one rule of a network security system. The computing device can be configured to determine a delay in the exchange of data via the connections. The determination of the delay in the exchange of data via the another connection can be based on in part feedback about the application of the at least one rule. The computing device can be configured to connect a client device to one of the plurality of remote computing devices via at least one of the one connection or the another connection based on the determined delay in the exchange of data via the connections.

In embodiments, the computing device can be configured to initiate the another connection to the second remote computing device responsive to performing a handshake with the first remote computing device. The another connection can have a sequence number associated with a sequence number of the one connection to the first remote computing device. The computing device can be configured to select, responsive to a comparison of the delay in the exchange of data of the one connection to the delay in the exchange of data of the another connection, the one connection to the first remote computing device to connect a client device to the first remote computing device. The computing device can be configured to compare a certificate communicated through the one connection to a certificate communicated through the another connection. The computing device can be configured to identify, responsive to a difference between certificates, an attack on the one connection. The computing device can be configured to select the another connection to connect a client device to the second remote computing device.

In embodiments, the computing device can be configured to identify a certificate communicated through the one connection matches a certificate communicated through the another connection. The computing device can be configured to select, responsive to the match between certificates, the one connection to connect a client device to the first remote computing device. The computing device can be configured to maintain, in a database, a plurality of connection decisions to the plurality of remote computing devices. In embodiments, each connection decision can indicate a remote computing device, certificate associated with the remote computing device and a selected connection. The computing device can be configured to select, using the plurality of connection decisions, the one connection to the first remote computing device or the another connection to the second remote computing device for subsequent requests from one or more client devices to one or more remote computing devices of the plurality of remote computing devices.

The details of various embodiments of the disclosure are set forth in the accompanying drawings and the description below.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

Figure 1A:
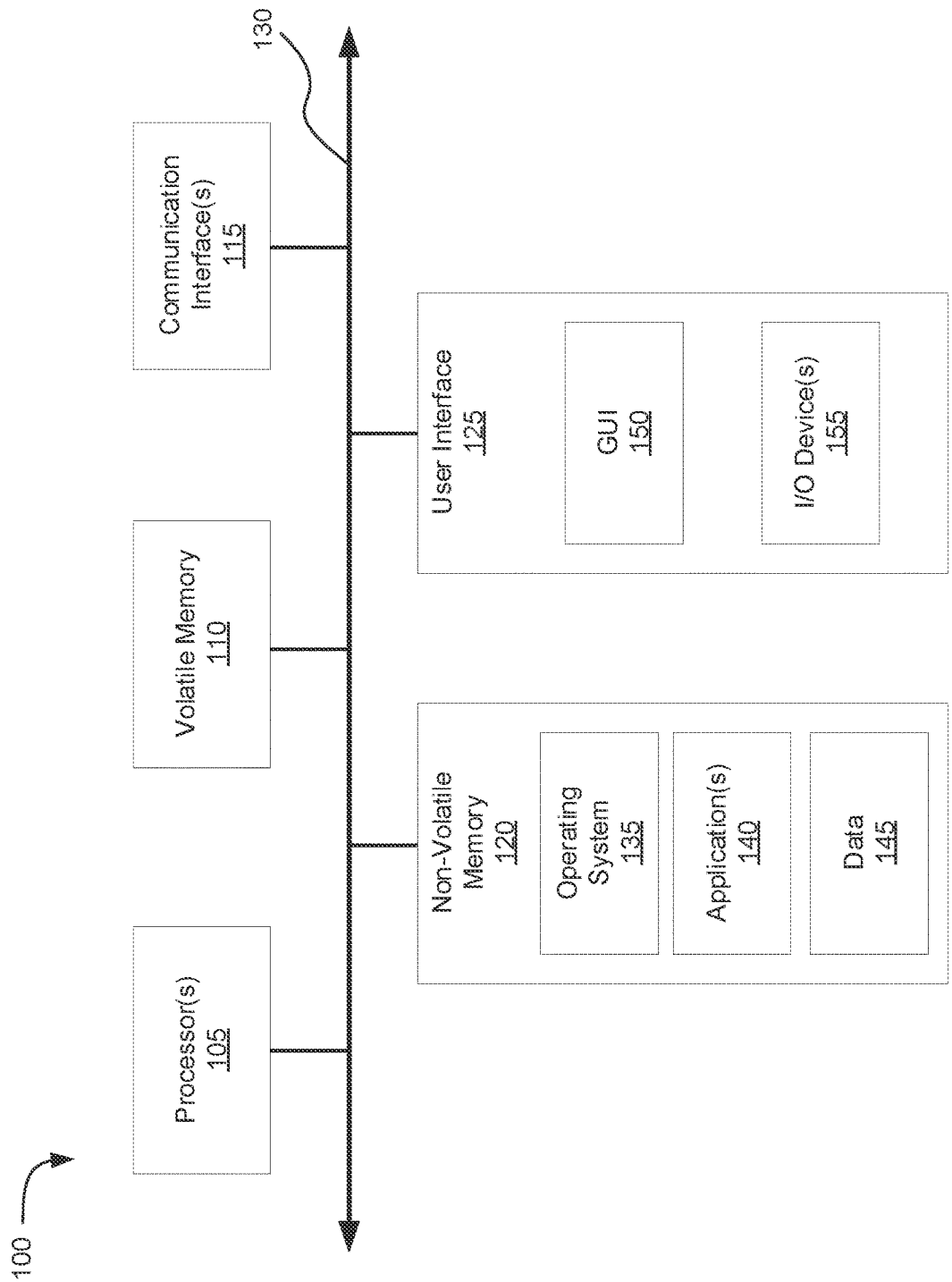
FIG. 1A is a block diagram of embodiments of a computing device.

Systems and methods for intelligent path selection to reduce latency and maintain security are provided herein. A determination can be made to choose between breaking out traffic from a branch office or back-hauling the traffic through a data center, based in part on a latency of the respective connections and/or a security level of the respective connections. A device can imitate a connection to a server directly from a branch office and, for example, in parallel, initiate a second connection that is back-hauled through a data center to the server. The device can determine a latency of the connections and determine a security characteristic of the connections by transmitting traffic and/or probing the second connection through the data center. The security characteristic can include or indicate if the connection is safe and connected to a trustworthy server or if the connection is a security threat, vulnerable to attack or connected to a fraudulent actor, for example, during a DNS spoofing attack, server spoofing attack or man-in-the-middle attack. In embodiments, the device can select the first connection or the second connection to connect a client device to the server based in part on the latency of the connections and the security characteristics of the connections.

In embodiments, to provide a secure environment, networks or enterprises can backhaul a portion of their internet traffic from branch offices through internal or private data centers. Backhaul as used herein can refer to or include transmitting or passing traffic from one end point (e.g., client device) to a different end point (e.g., server) through a datacenter, gateway, communications hub, central proxy and/or predefined site. In embodiments, backhauling traffic can include transmitting internet traffic intended for a server or branch site through a data center that can access the internet and transmit the traffic to intended server or branch site. The traffic through the data centers can be monitored and managed, for example, using firewall settings to control what traffic is blocked or rejected and what traffic is passed through to one or more servers or remote computing devices. The traffic can be actively monitored as compared to traffic that is transmitted to a server directly from a client and/or branch office through an external connection or public network. However, the technique of backhauling the traffic through the data center can introduce latency or delays in communications between a client device and a server or remote computing device as the traffic is transmitted through the data center and then to a server instead of being transmitted directly from a client device to the server. In some embodiments, the latency issues and delays in communications caused by backhauling the traffic through the data center can cause or result in performance issues and/or reduced user experience for an end user or client device.

The systems and methods described herein can initiate two or more connections in parallel (and/or at the same time) and make a determination about which connection or path to select based in part on a latency of the connections and a security level of the connections to maintain or increase a performance of the connection between a client device and a server and/or increase user experience for an end user or client device. A device (e.g., network edge router, traffic proxy) can receive a request from a client device to access a server or remote computing device and can initiate two or more connections in parallel to determine a best and/or secure path to connect the client device to the server. The best path can include a path with the lowest latency and/or not under attack or connected to fraudulent actors (e.g., DNS spoofing, server spoofing). The device can enable traffic to directly break out from a branch office through a first connection, or, if the first connection from the branch office becomes vulnerable to an attack (e.g., DNS spoofing, server spoofing, man-in-the-middle), the device can use the second connection to backhaul the traffic through a data center which often provides more security but the latency of that connection is higher. Break out as used herein can refer to transmitting internet bound traffic from a client device directly to an intended destination or server through a local branch office or local internet service provider. In embodiments, the device can use feedback and/or traffic properties of the second connection through the data center to determine a security level of the first connection. The feedback and traffic properties can be used to determine if the connection is to the correct server originally requested by the client device. The device can make a runtime determination (e.g., determination during initiation of connections) or real-time determination to select the best path based on network latency, between breakout connection or the backhauled connection. The device can provide a more secure and optimal way to route traffic to reduce latency and maintain a secure connection between the client device and the server.

The device can use the feedback from the backhauled connection to determine or verify a security level of the direct connection from the branch office and/or detect the presence of a security threat through the direct connection to the server from the branch office. The two connections can be initiated in parallel or substantially the same time and the device can transmit traffic or monitor traffic through both connections to detect a security threat through the direct connection. In embodiments, the device can use feedback from the backhauled connection, including but not limited to, certificate information, firewall settings, application of a network rule, and/or handshake communications, to detect a security threat present (e.g., man-in-the-middle proxy, DNS spoofing) in the direct connection from the branch and over a public network or internet. In some embodiments, a coordinated attack on both a branch office and a data center may be less likely, thus the device can use differences between characteristics of traffic communicated through the direct connection and the backhauled connection to detect an attack or security issue on at least one of the direct connection and the backhauled connection. For example, during a DNS spoofing attack or man-in-the-middle attack, the device can compare certificates received through both connections during a handshake process to detect the attack. The device may establish attempt to establish a backhauled connection to a requested server through the datacenter and attempt to establish a direct connection to the requested server from the branch office but the direct connection (e.g., breakout connection) may be corrupted or connected to a bot or fraudulent actor. During the handshake process, the device can request certificates and if the certificates are different, the device can determine that direct connection is under attack and/or connected to the bot or fraudulent actor due to the differences in certificates. In embodiments, the device can use the differences between characteristics of traffic communicated through the direct connection and the backhauled connection to detect differences in IP address and/or certificates (e.g., TLS certificates) communicated through the direct connection and potentially generated by an attacker or bot. The device can select the backhauled connection to connect a client device to the server to prevent the attack through the direct connection and maintain a secure connection for the client device.

In embodiments, the device can infer or use security setting of the data center or a centralized security gateway to verity or determine a security level of the direct connection from the branch office. The device can transmit data packets or probing connections through the data center to observe an outcome or response. The outcomes or responses can include a response or outcome of a handshake communication with a requested server or application of deny rules or firewall settings for traffic to the server from the data center. The device can use the feedback on the backhauled connection to apply the same policies or rules locally to the direct connection from the branch office. For example, differences in outcomes or responses can indicate that the direct connection from the branch office is corrupted or poses a security threat (e.g., deny rule matches on data center firewall). The device can use to settings, policies and rules of the data center to control communications through both connections without establishing additional firewall settings or gateways and without additional administrative overhead.

In embodiments, a client can request to access a server or remote computing device. The request can include a domain name system (DNS) request to a public DNS server and the client can receive an address or destination IP address for the server. In some embodiments, the DNS server can recommend a best or preferred server (e.g., best post office protocol (POP) server) or appropriate server for the client. In embodiments, the server can be selected based at least in part on a source IP address of the client and an IP address of the selected server for a direct connection from a branch office, as compared to a server closer to a data center for a backhauled connection. The DNS server can transmit the IP address for the selected server to the client.

The client device can initiate a connection with the selected server using a handshake (e.g., transport layer security (TLS) handshake). A device (e.g., router, proxy device) can break out the connection directly from a branch office or initiate a first connection to the server from a branch office for the client device and assign the connection a sequence number. The device can generate a new sequence number (e.g., transmission control protocol (TCP) sequence number) for a second connection and initiate the second connection through a data center to backhaul the connection to the server. The sequence numbers can be unique to the connections and used to identify the respective connections. The sequence number for the second connection can be a rotated or modified version of the sequence number for the device to identify a relationship between the first connection and the second connection. In embodiments, the device can initiate the second connection in parallel with the first connection, for example, as a duplicate connection, test connection or backup connection. The first connection and the second connection can include associated sequence numbers with the sequence number of the second connection rotated with respect to the sequence number of the first connection. The device can determine and store a value of the latency or delay in communications through the first connection and the second connection. In embodiments, the device can determine and store a value of the latency of data packets communicated through the first connection and the second connection during initiating or establishing the connections, including but not limited to a SYN packet and SYN-ACK packet. The device can determine the connection having the lowest latency or delay in communications.

The device can determine a security level of the first connection and second connection based in part on feedback and/or rules applied through the second connection. The feedback can include certificate data, rule matches, firewall settings and/or handshake communications to implement security settings of the second connection for the first connection from the branch office. The device can compare a certificate (e.g., server secure sockets layer (SSL) certificate) communicated through the first connection and the second connection to determine the security level of the first connection and second connection. In embodiments, if the certificates match, the device can determine the server is trustworthy and/or the first connection is safe. If the first connection has a lower latency and the certificates match between the connections, the device can select the first connection from the branch office and directly break out traffic from the client device to the server through the first connection.

In embodiments, if the certificates are different, the device can determine the server accessed through the first connection is not trustworthy and/or the first connection is under attack or poses a security threat. In some embodiments, the different certificates can indicate that the server communicated with through the first connection is different from the server communicated with through the second connection or can indicate a DNS spoofing attack or man-in-the-middle (MITM) attacks through the first connection. The device can select the second connection through the data center and backhaul traffic through the data center to for communications between the client device and the server.

The device can apply one or more rules of the data center to determine the security level of the first connection and second connection. For example, the device can determine if a rule matches on the data center firewall for a communication through the second connection indicating the communication was blocked or prevented and reject the first connection through the branch office and/or reject the request for access to the server. In embodiments, if the first connection has a lower latency than the second connection, the device can determine to accept the first connection and connect the client device to the server through the first connection directly from the branch office.

The device can use communications and/or handshake communications through the first connection and second connection to determine the security level of the first connection and second connection. The device can determine if an appropriate response was received during handshake communications with the server, including but not limited to if a SYN-ACK was received for a TCP SYN request, a server hello was received for a SSL client hello, or a FIN RST packet was received after connection establishment, to determine the security level of the first connection and second connection. In one embodiment, the device can reject the first connection through the branch office if at least one of a SYN-ACK received for a TCP SYN request, a server hello received for a SSL client hello, or a FIN RST packet received after connection establishment, were not received during communications with the server.

The device can apply a rule of a firewall of the data center to determine the security level of the first connection and second connection. In embodiments, the device can determine to reject the first connection through the branch office and/or reject the request for access to the server if a rule indicates an SSL interception or a man-in-the middle attack. The device can compare the SSL certificates communicated through the first connection and second connection to determine if the certificates are signed by the same device, server or enterprise device. The device can maintain the second connection backhauled through the data center to connect the client device to the server responsive to the inspect rule match.

The device can store and maintain a database of decisions about selection of connections, for example, to apply to a subsequent request to the same server or remote computing device. In embodiments, after the device makes a decision or selection to directly branch out or backhaul a connection to a server, the device can cache the decision with a time out value and can apply it to future or subsequent connection requests to the same server, remote computing device or destination. For a subsequent request, the device can verify the certificate of the requested destination (e.g., verify same server SSL certificate), and if the certificates match, the device can apply the cached decision or determination to the subsequent request and directly break out the connection from the branch office ort backhaul the connection though the data center based on the cached decision. In embodiments, if the certificates do not match, the device can backhaul the connection through the data center for the subsequent connection or make a new decision about the proposed connection based in part on a current latency of the possible connection paths and/or a security level of the possible connection paths (e.g., direct connection, backhauled connections).

The systems and method described herein provide an improved performance due to reduced network latency while maintaining a security level of a connection between a client device and a server and remote computing device. The device can initiate two connections in parallel, including a direct connection from a branch office (or computing device intermediary between the endpoint and the data center) and a backhauled connection through a data center and use feedback from the backhauled connection to determine the appropriate connection for the client device. The device can use security settings and/or rule of the backhauled connection to detect an attack or security issue on the direct connection from the branch office and overcome potential security vulnerabilities associated with DNS breakouts from a branch office. The device can make an informed and intelligent decision to backhaul connections in cases of an SSL interception or other forms of attack are detected using the feedback from the backhauled connection. The device can optimize or increase a speed of selection for subsequent requests by storing and caching connection decisions for different servers, remote computing devices and/or destinations.

Section A describes a computing environment which may be useful for practicing embodiments described herein;

Section B describes a network environment and computing environment which may be useful for practicing embodiments described herein; and Section C describes methods and systems for intelligent path selection to reduce latency and maintain security.

A. Computing Environment

Prior to discussing the specifics of embodiments of the systems and methods of for securing offline data (e.g., browser offline data) for shared accounts, it may be helpful to discuss the computing environments in which such embodiments may be deployed.

As shown in FIG. 1A, computer 100 may include one or more processors 105, volatile memory 110 (e.g., random access memory (RAM)), non-volatile memory 120 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 125, one or more communications interfaces 115, and communication bus 130. User interface 125 may include graphical user interface (GUI) 150 (e.g., a touchscreen, a display, etc.) and one or more input/output (I/O) devices 155 (e.g., a mouse, a keyboard, a microphone, one or more speakers, one or more cameras, one or more biometric scanners, one or more environmental sensors, one or more accelerometers, etc.). Non-volatile memory 120 stores operating system 135, one or more applications 140, and data 145 such that, for example, computer instructions of operating system 135 and/or applications 140 are executed by processor(s) 105 out of volatile memory 110. In some embodiments, volatile memory 110 may include one or more types of RAM and/or a cache memory that may offer a faster response time than a main memory. Data may be entered using an input device of GUI 150 or received from I/O device(s) 155. Various elements of computer 100 may communicate via one or more communication buses, shown as communication bus 130.

Computer 100 as shown in FIG. 1A is shown merely as an example, as clients, servers, intermediary and other networking devices and may be implemented by any computing or processing environment and with any type of machine or set of machines that may have suitable hardware and/or software capable of operating as described herein. Processor(s) 105 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 115 may include one or more interfaces to enable computer 100 to access a computer network such as a Local Area Network (LAN), a Wide Area Network (WAN), a Personal Area Network (PAN), or the Internet through a variety of wired and/or wireless or cellular connections.

In described embodiments, the computing device 100 may execute an application on behalf of a user of a client computing device. For example, the computing device 100 may execute a virtual machine, which provides an execution session within which applications execute on behalf of a user or a client computing device, such as a hosted desktop session. The computing device 100 may also execute a terminal services session to provide a hosted desktop environment. The computing device 100 may provide access to a computing environment including one or more of: one or more applications, one or more desktop applications, and one or more desktop sessions in which one or more applications may execute.

Figure 1B:
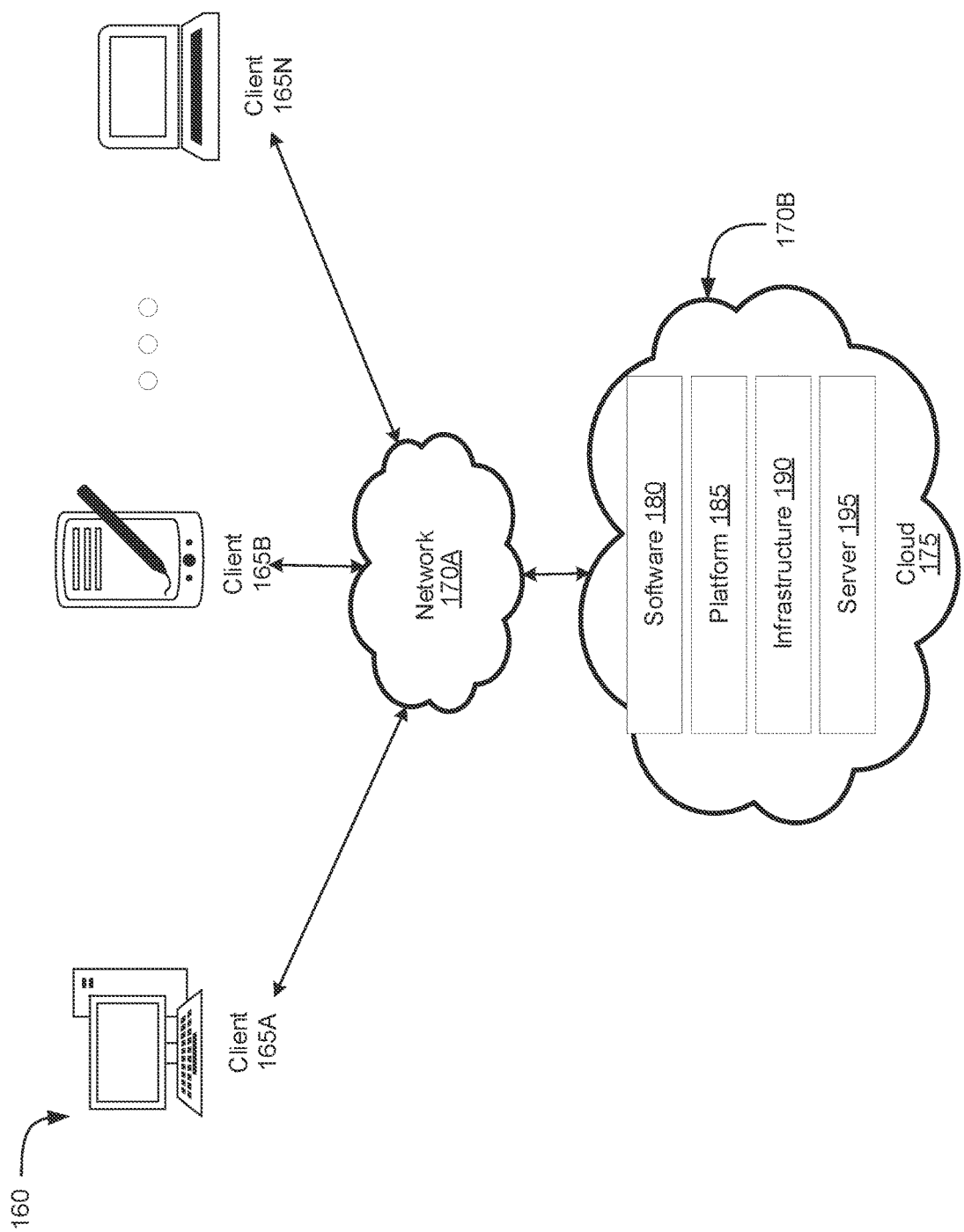
FIG. 1B is a block diagram depicting a computing environment comprising client device in communication with cloud service providers.

Referring to FIG. 1B, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but are not limited to, networks, network bandwidth, servers 195, processing, memory, storage, applications, virtual machines, databases, software, hardware, analytics, and intelligence.

In embodiments, the computing environment 160 may provide client 165 with one or more resources provided by a network environment. The computing environment 160 may include one or more clients 165a-165n, in communication with a cloud 175 over one or more networks 170A, 170B. Clients 165 may include, e.g., thick clients, thin clients, and zero clients. The cloud 175 may include back end platforms, e.g., servers 195, storage, server farms or data centers. The clients 165 can be the same as or substantially similar to computer 100 of FIG. 1A.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In embodiments, the computing environment 160 can include a hybrid cloud that is a combination of a public cloud and a private cloud. For example, the cloud 175 may be public, private, or hybrid. Public clouds 175 may include public servers 195 that are maintained by third parties to the clients 165 or the owners of the clients 165. The servers 195 may be located off-site in remote geographical locations as disclosed above or otherwise. Public clouds 175 may be connected to the servers 195 over a public network 170. Private clouds 175 may include private servers 195 that are physically maintained by clients 165 or owners of clients 165. Private clouds 175 may be connected to the servers 195 over a private network 170. Hybrid clouds 175 may include both the private and public networks 170A, 170B and servers 195.

The cloud 175 may include back end platforms, e.g., servers 195, storage, server farms or data centers. For example, the cloud 175 can include or correspond to a server 195 or system remote from one or more clients 165 to provide third party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 160 can provide on-demand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include server-less computing. The computing environment 160 can include Software as a service (SaaS). For example, the cloud 175 may also include a cloud based delivery, e.g. Software as a Service (SaaS) 180, Platform as a Service (PaaS) 185, and Infrastructure as a Service (IaaS) 190. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 165 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 165 may also access SaaS resources through smartphone or tablet applications, including, e.g., Salesforce Sales Cloud, or Google Drive app. Clients 165 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

B. Network and Computing Environment

Figure 2A:
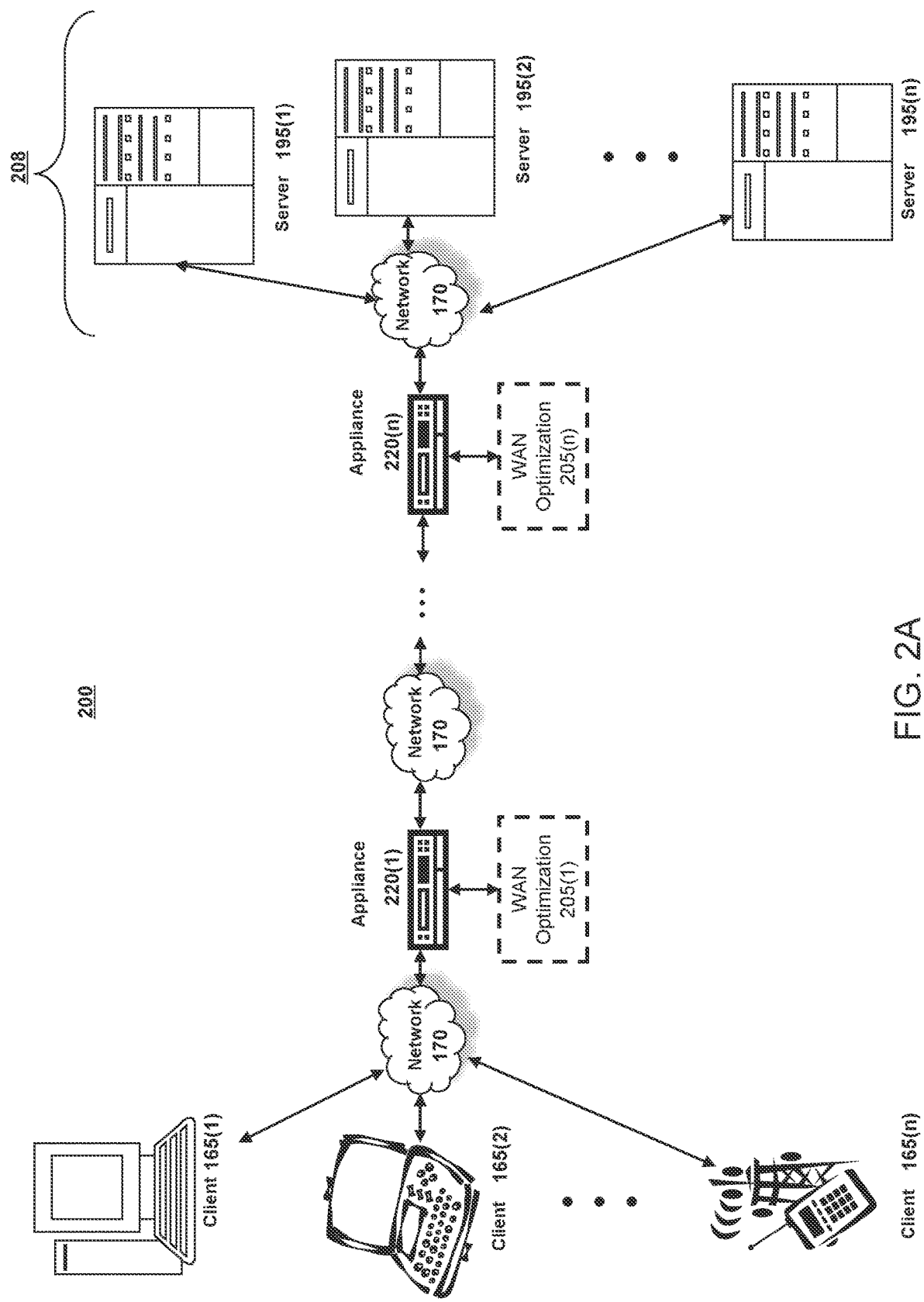
FIG. 2A is a block diagram of a network computing system, in accordance with an illustrative embodiment.

Referring to FIG. 2A, an illustrative network environment 200 is depicted. Network environment 200 may include one or more clients 165(1)-165(n) (also generally referred to as local machine(s) 165 or client(s) 165) in communication with one or more servers 195(1)-195(n) (also generally referred to as remote machine(s) 195 or server(s) 195) via one or more networks 170(1)-170n (generally referred to as network(s) 170). In some embodiments, a client 165 may communicate with a server 195 via one or more appliances 220(1)-220n (generally referred to as appliance(s) 220 or gateway(s) 220).

Although the embodiment shown in FIG. 2A shows one or more networks 170 between clients 165 and servers 195, in other embodiments, clients 165 and servers 195 may be on the same network 170. The various networks 170 may be the same type of network or different types of networks. For example, in some embodiments, network 170(1) may be a private network such as a local area network (LAN) or a company Intranet, while network 170(2) and/or network 170(n) may be a public network, such as a wide area network (WAN) or the Internet. In other embodiments, both network 170(1) and network 170(n) may be private networks. Networks 170 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 2A, one or more appliances 220 may be located at various points or in various communication paths of network environment 200. For example, appliance 220 may be deployed between two networks 170(1) and 170(2), and appliances 220 may communicate with one another to work in conjunction to, for example, accelerate network traffic between clients 165 and servers 195. In other embodiments, the appliance 220 may be located on a network 170. For example, appliance 220 may be implemented as part of one of clients 165 and/or servers 195.

As shown in FIG. 2A, one or more servers 195 may operate as a server farm 208. Servers 195 of server farm 208 may be logically grouped, and may either be geographically co-located (e.g., on premises) or geographically dispersed (e.g., cloud based) from clients 165 and/or other servers 195. In an embodiment, server farm 208 executes one or more applications on behalf of one or more of clients 165 (e.g., as an application server), although other uses are possible, such as a file server, gateway server, proxy server, or other similar server uses. Clients 165 may seek access to hosted applications on servers 195.

As shown in FIG. 2A, in some embodiments, appliances 220 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 220 may be a performance enhancing proxy or a WAN optimization controller.

Figure 2B:
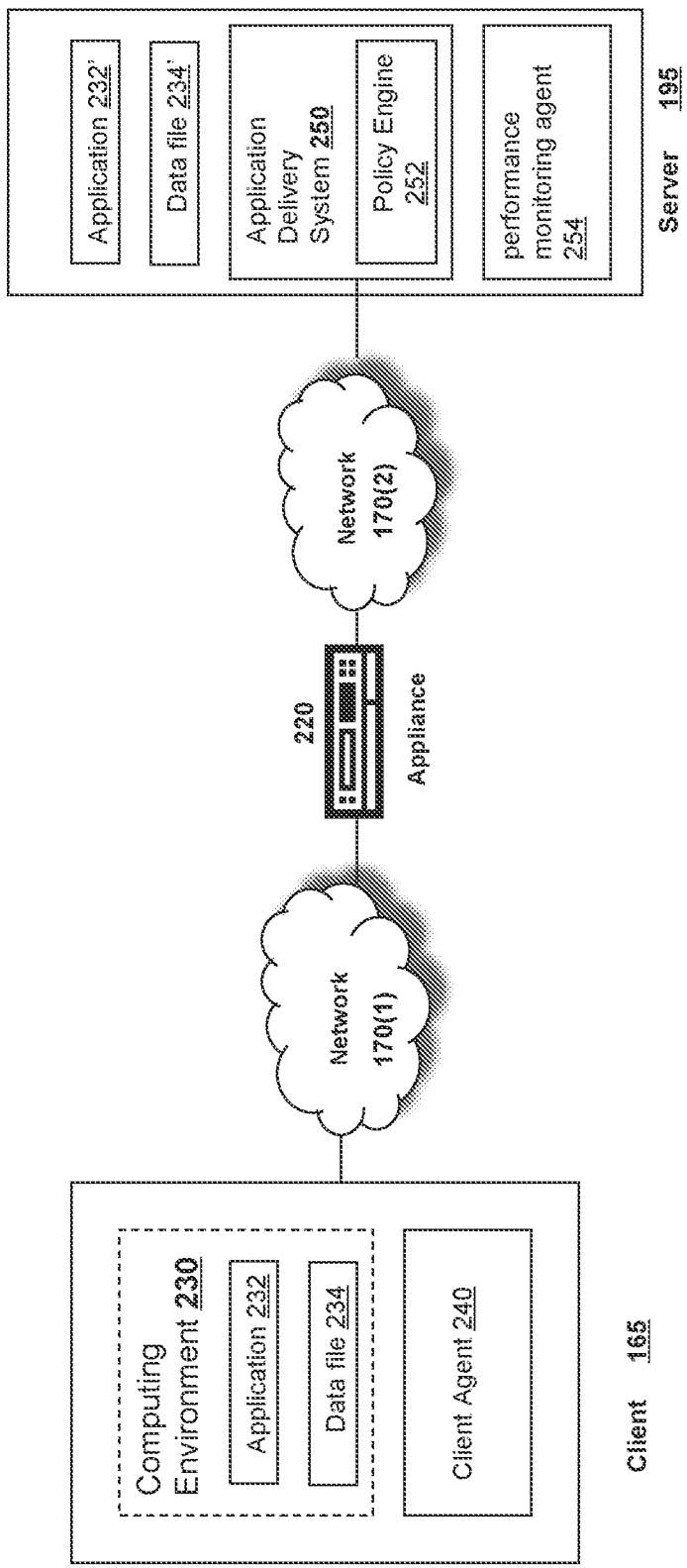
FIG. 2B is a block diagram of a network computing system for delivering a computing environment from a server to a client via an appliance, in accordance with an illustrative embodiment.

Referring to FIG. 2B, an example network environment, 200', for delivering and/or operating a computing network environment on a client 165 is shown. As shown in FIG. 2B, a server 195 may include an application delivery system 250 for delivering a computing environment, application, and/or data files to one or more clients 165. Client 165 may include client agent 240 and computing environment 230. Computing environment 230 may execute or operate an application, 16, that accesses, processes or uses a data file 234. Computing environment 230, application 232 and/or data file 234 may be delivered via appliance 220 and/or the server 195.

Appliance 220 may accelerate delivery of all or a portion of computing environment 230 to a client 165, for example by the application delivery system 250. For example, appliance 220 may accelerate delivery of a streaming application and data file processable by the application from a data center to a remote user location by accelerating transport layer traffic between a client 165 and a server 195. Such acceleration may be provided by one or more techniques, such as: 1) transport layer connection pooling, 2) transport layer connection multiplexing, 3) transport control protocol buffering, 4) compression, 5) caching, or other techniques. Appliance 220 may also provide load balancing of servers 195 to process requests from clients 165, act as a proxy or access server to provide access to the one or more servers 195, provide security and/or act as a firewall between a client 165 and a server 195, provide Domain Name Service (DNS) resolution, provide one or more virtual servers or virtual internet protocol servers, and/or provide a secure virtual private network (VPN) connection from a client 165 to a server 195, such as a secure socket layer (SSL) VPN connection and/or provide encryption and decryption operations.

Application delivery management system 250 may deliver computing environment 230 to a user (e.g., client 165), remote or otherwise, based on authentication and authorization policies applied by policy engine 252. A remote user may obtain a computing environment and access to server stored applications and data files from any network-connected device (e.g., client 165). For example, appliance 220 may request an application and data file from server 195. In response to the request, application delivery system 250 and/or server 195 may deliver the application and data file to client 165, for example via an application stream to operate in computing environment 230 on client 165, or via a remote-display protocol or otherwise via remote-based or server-based computing.

Policy engine 252 may control and manage the access to, and execution and delivery of, applications. For example, policy engine 252 may determine the one or more applications a user or client 165 may access and/or how the application should be delivered to the user or client 165, such as a server-based computing, streaming or delivering the application locally to the client 240 for local execution.

For example, in operation, a client 165 may request execution of an application (e.g., application 232') and application delivery system 250 of server 195 determines how to execute application 232', for example based upon credentials received from client 165 and a user policy applied by policy engine 252 associated with the credentials. For example, application delivery system 250 may enable client 165 to receive application-output data generated by execution of the application on a server 195, may enable client 165 to execute the application locally after receiving the application from server 195, or may stream the application via network 170 to client 165. For example, in some embodiments, the application may be a server-based or a remote-based application executed on server 195 on behalf of client 165. The application may be any application related to real-time data communications, such as applications for streaming graphics, streaming video and/or audio or other data, delivery of remote desktops or workspaces or hosted services or applications, for example infrastructure as a service (IaaS), desktop as a service (DaaS), workspace as a service (WaaS), software as a service (SaaS) or platform as a service (PaaS).

One or more of servers 195 may include a performance monitoring service or agent 244. In some embodiments, a dedicated one or more servers 195 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 165 (e.g., client agent 240), servers 195 (e.g., agent 254) or an appliance 220. In general, monitoring agents (e.g., 240 and/or 254) execute transparently (e.g., in the background) to any application and/or user of the device.

The monitoring agents 240 and 254 may monitor, measure, collect, and/or analyze data on a predetermined frequency, based upon an occurrence of given event(s), or in real time during operation of network environment 200. The monitoring agents 240 and 254 may monitor resource consumption and/or performance of hardware, software, and/or communications resources of clients 165, networks 170, appliances 220 and/or WAN optimization appliances 205, and/or servers 195. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 240 and 254 may provide application performance management for application delivery system 250. For example, based upon one or more monitored performance conditions or metrics, application delivery system 250 may be dynamically adjusted, for example periodically or in real-time, to optimize application delivery by servers 195 to clients 165 based upon network environment performance and conditions.

In described embodiments, clients 165, servers 195, and appliances 220 and WAN optimization appliances 205 may be deployed as and/or executed on any type and form of computing device, such as any desktop computer, laptop computer, or mobile device capable of communication over at least one network and performing the operations described herein. For example, clients 165, servers 195 and/or appliances 220 and WAN optimization appliances 205 may each correspond to one computer, a plurality of computers, or a network of distributed computers such as computer 100 shown in FIG. 1A.

Figure 3:
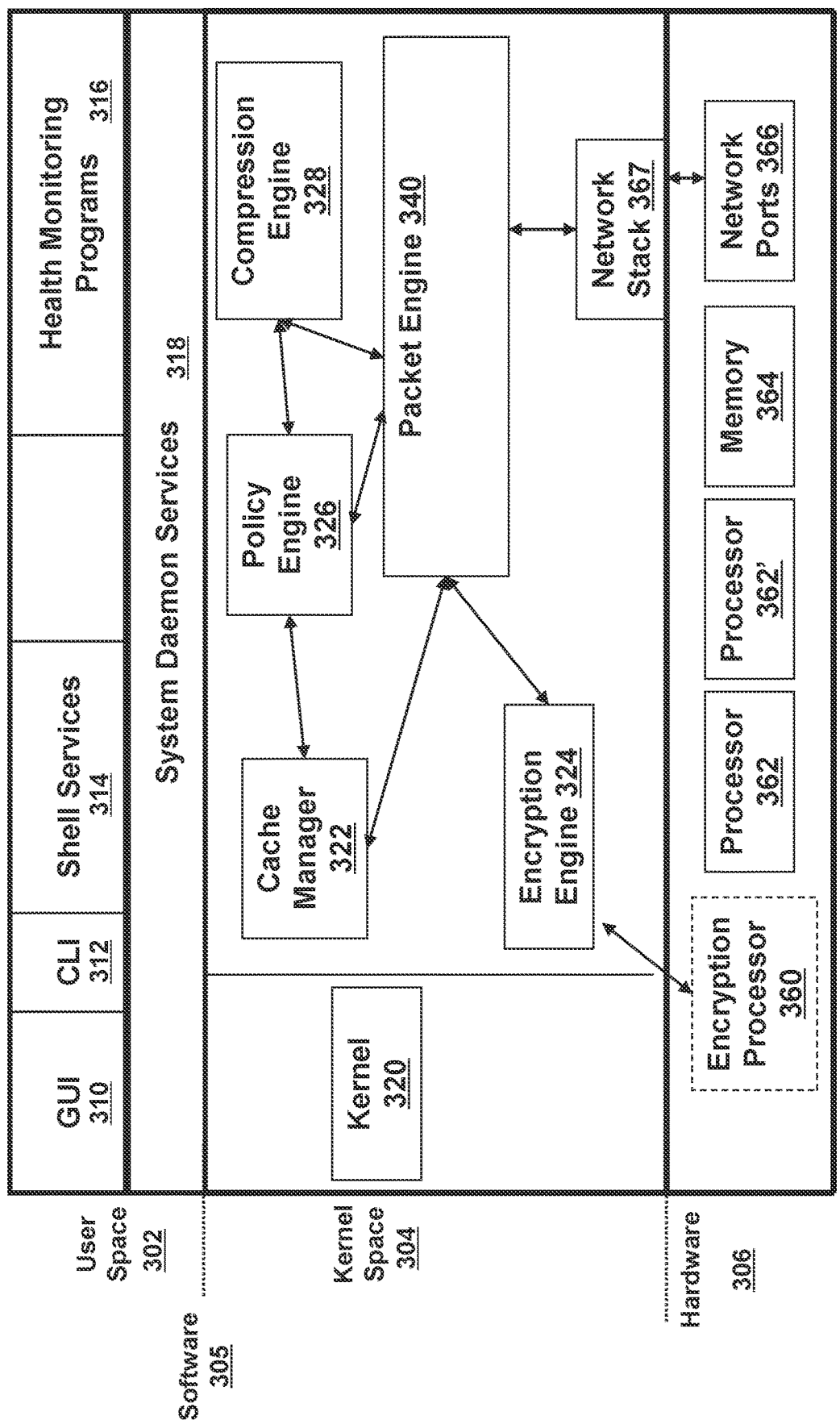
FIG. 3 is a block diagram of an appliance for processing communications between a client and a server, in accordance with an illustrative embodiment.

FIG. 3 shows an example embodiment of appliance 220. As described herein, appliance 220 may be implemented as a server, gateway, router, switch, bridge or other type of computing or network device. As shown in FIG. 3, an embodiment of appliance 220 may include a hardware layer 306 and a software layer 305 divided into a user space 302 and a kernel space 304. Hardware layer 306 provides the hardware elements upon which programs and services within kernel space 304 and user space 302 are executed and allow programs and services within kernel space 304 and user space 302 to communicate data both internally and externally with respect to appliance 220. As shown in FIG. 3, hardware layer 306 may include one or more processing units 362 for executing software programs and services, memory 364 for storing software and data, network ports 366 for transmitting and receiving data over a network, and encryption processor 360 for encrypting and decrypting data such as in relation to Secure Socket Layer (SSL) or Transport Layer Security (TLS) processing of data transmitted and received over the network.

An operating system of appliance 220 allocates, manages, or otherwise segregates the available system memory into kernel space 304 and user space 302. Kernel space 304 is reserved for running kernel 320, including any device drivers, kernel extensions or other kernel related software. As known to those skilled in the art, kernel 320 is the core of the operating system, and provides access, control, and management of resources and hardware-related elements of appliance 220. Kernel space 304 may also include a number of network services or processes working in conjunction with cache manager 322.

Appliance 220 may include one or more network stacks 367, such as a TCP/IP based stack, for communicating with client(s) 165, server(s) 195, network(s) 170, and/or other appliances 220 or WAN optimization appliances 205. For example, appliance 220 may establish and/or terminate one or more transport layer connections between clients 165 and servers 195. Each network stack 367 may include a buffer 243 for queuing one or more network packets for transmission by appliance 220.

Kernel space 304 may include cache manager 322, packet engine 340, encryption engine 324, policy engine 326 and compression engine 328. In other words, one or more of processes 322, 340, 324, 326 and 328 run in the core address space of the operating system of appliance 220, which may reduce the number of data transactions to and from the memory and/or context switches between kernel mode and user mode, for example since data obtained in kernel mode may not need to be passed or copied to a user process, thread or user level data structure.

Cache manager 322 may duplicate original data stored elsewhere or data previously computed, generated or transmitted to reducing the access time of the data. In some embodiments, the cache memory may be a data object in memory 364 of appliance 220, or may be a physical memory having a faster access time than memory 364.

Policy engine 326 may include a statistical engine or other configuration mechanism to allow a user to identify, specify, define or configure a caching policy and access, control and management of objects, data or content being cached by appliance 220, and define or configure security, network traffic, network access, compression or other functions performed by appliance 220.

Encryption engine 324 may process any security related protocol, such as SSL or TLS. For example, encryption engine 324 may encrypt and decrypt network packets, or any portion thereof, communicated via appliance 220, may setup or establish SSL, TLS or other secure connections, for example between client 165, server 195, and/or other appliances 220 or WAN optimization appliances 205. In some embodiments, encryption engine 324 may use a tunneling protocol to provide a VPN between a client 165 and a server 195. In some embodiments, encryption engine 324 is in communication with encryption processor 360. Compression engine 328 compresses network packets bi-directionally between clients 165 and servers 195 and/or between one or more appliances 220.

Packet engine 340 may manage kernel-level processing of packets received and transmitted by appliance 220 via network stacks 367 to send and receive network packets via network ports 366. Packet engine 340 may operate in conjunction with encryption engine 324, cache manager 322, policy engine 326 and compression engine 328, for example to perform encryption/decryption, traffic management such as request-level content switching and request-level cache redirection, and compression and decompression of data.

User space 302 is a memory area or portion of the operating system used by user mode applications or programs otherwise running in user mode. A user mode application may not access kernel space 304 directly and uses service calls in order to access kernel services. User space 302 may include graphical user interface (GUI) 310, a command line interface (CLI) 312, shell services 314, health monitor 316, and daemon services 318. GUI 310 and CLI 312 enable a system administrator or other user to interact with and control the operation of appliance 220, such as via the operating system of appliance 220. Shell services 314 include the programs, services, tasks, processes or executable instructions to support interaction with appliance 220 by a user via the GUI 310 and/or CLI 312.

Health monitor 316 monitors, checks, reports and ensures that network systems are functioning properly and that users are receiving requested content over a network, for example by monitoring activity of appliance 220. In some embodiments, health monitor 316 intercepts and inspects any network traffic passed via appliance 220. For example, health monitor 316 may interface with one or more of encryption engine 324, cache manager 322, policy engine 326, compression engine 328, packet engine 340, daemon services 318, and shell services 314 to determine a state, status, operating condition, or health of any portion of the appliance 220. Further, health monitor 316 may determine if a program, process, service or task is active and currently running, check status, error or history logs provided by any program, process, service or task to determine any condition, status or error with any portion of appliance 220. Additionally, health monitor 316 may measure and monitor the performance of any application, program, process, service, task or thread executing on appliance 220.

Daemon services 318 are programs that run continuously or in the background and handle periodic service requests received by appliance 220. In some embodiments, a daemon service may forward the requests to other programs or processes, such as another daemon service 318 as appropriate.

As described herein, appliance 220 may relieve servers 195 of much of the processing load caused by repeatedly opening and closing transport layer connections to clients 165 by opening one or more transport layer connections with each server 195 and maintaining these connections to allow repeated data accesses by clients via the Internet (e.g., "connection pooling"). To perform connection pooling, appliance 220 may translate or multiplex communications by modifying sequence numbers and acknowledgment numbers at the transport layer protocol level (e.g., "connection multiplexing"). Appliance 220 may also provide switching or load balancing for communications between the client 165 and server 195.

As described herein, each client 165 may include client agent 240 for establishing and exchanging communications with appliance 220 and/or server 195 via a network 170. Client 165 may have installed and/or execute one or more applications that are in communication with network 170. Client agent 240 may intercept network communications from a network stack used by the one or more applications. For example, client agent 240 may intercept a network communication at any point in a network stack and redirect the network communication to a destination desired, managed or controlled by client agent 240, for example to intercept and redirect a transport layer connection to an IP address and port controlled or managed by client agent 240. Thus, client agent 240 may transparently intercept any protocol layer below the transport layer, such as the network layer, and any protocol layer above the transport layer, such as the session, presentation or application layers. Client agent 240 can interface with the transport layer to secure, optimize, accelerate, route or load-balance any communications provided via any protocol carried by the transport layer.

In some embodiments, client agent 240 is implemented as an Independent Computing Architecture (ICA) client developed by Citrix Systems, Inc. of Fort Lauderdale, Fla. Client agent 240 may perform acceleration, streaming, monitoring, and/or other operations. For example, client agent 240 may accelerate streaming an application from a server 195 to a client 165. Client agent 240 may also perform end-point detection/scanning and collect end-point information about client 165 for appliance 220 and/or server 195. Appliance 220 and/or server 195 may use the collected information to determine and provide access, authentication and authorization control of the client's connection to network 170. For example, client agent 240 may identify and determine one or more client-side attributes, such as: the operating system and/or a version of an operating system, a service pack of the operating system, a running service, a running process, a file, presence or versions of various applications of the client, such as antivirus, firewall, security, and/or other software.

C. Methods and Systems for Intelligent Path Selection to Reduce Latency and Maintain Security Systems and methods for intelligent path selection to reduce latency and maintain security are provided herein. A client can request access to a server and multiple connections can be initiated to the requested destination, for example, a direct connection from a branch office (e.g., a computing device intermediary between an endpoint device and a data center) and a backhauled connection through a data center. The backhauled connection can include transmitting or passing traffic from one end point (e.g., client device) to a different end point (e.g., server) through a datacenter, gateway, communications hub, central proxy and/or predefined site. Traffic via the second connection can be controllable by application of at least one rule of the data center. A device can determine a delay in the exchange of data via the connections and a security level of the connections. The determination of the delay in the exchange of data via the another connection can be based on in part feedback about the application of the rule. The device can connect a client device to a server through one of the connections using the determination of the delay and the security level of the connection. In embodiments, the connections can be initiated in parallel and feedback or security settings of at least one connection (e.g., backhauled connection) can be applied to the other connection (e.g., direct connection) to determine a security level of the other connection and select at least one connection to connect a client device a requested server. The feedback can include the application of one or more firewall settings, rules applied at the data center, certificate comparisons and/or handshake communications performed through the backhauled connection to determine the security level of the direct connection and/or detect a security threat of the direct connection. The device can select at least one of the direct connection through the branch office (e.g., through an intermediary device outside of the datacenter) or the backhauled connection through the data center based in part on a latency of the respective connection and the security level of the respective connection.

Figure 4:
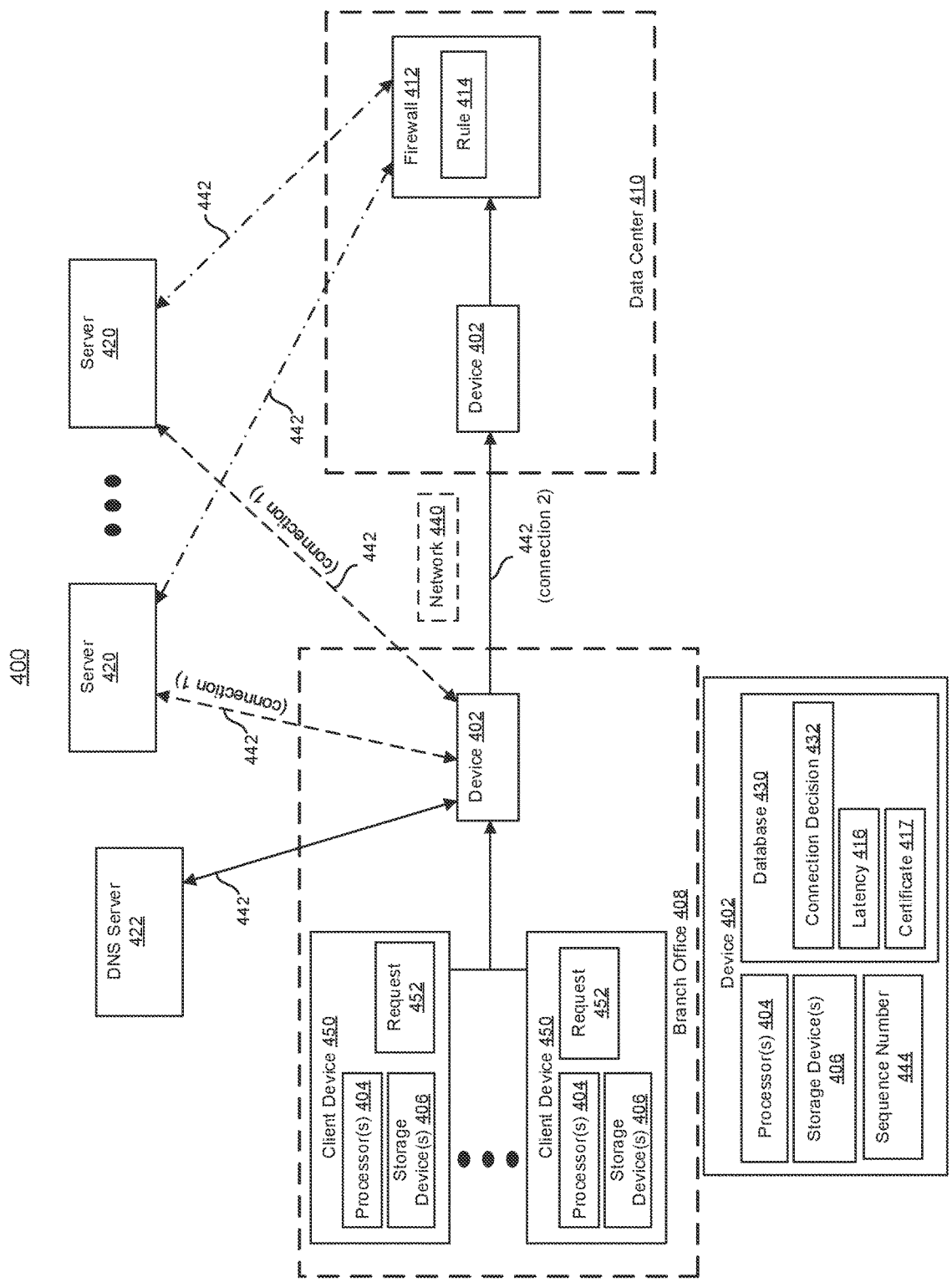
FIG. 4 is a block diagram of a system for intelligent path selection to reduce latency and maintain security, in accordance with an illustrative embodiment.

Referring now to FIG. 4, depicted is a block diagram of a system 400 for intelligent path selection to reduce latency and maintain security. The system 400 can include a device 402 (e.g., proxy device, host device, router) managing one or more connections 442 to servers (or remote computing devices) 420 for one or more clients 450. The device 402 can be deployed at one or more branch offices 408 (e.g., branch site, branch location) and/or one or more data centers 410 (e.g., network security system, head office, gateway). In some embodiments, the system 400 can include a first device 402 deployed at a branch office 408 and a second device 402 deployed at a data center 410 (e.g., network security system, head office, gateway) in communications to manage one or more connections 442 to servers (or remote computing devices) 420 for one or more clients 450.

The device 402 (also referred to herein as computing device) can include a server, host server, proxy device, router or computing device. The device 402 can manage, monitor and/or control connections 442 to a plurality servers 420 (e.g., remote computing devices). The device 402 can be implemented using hardware or a combination of software and hardware. For example, components of the device 402 can include logical circuitry (e.g., a central processing unit or CPU) that responds to and processes instructions fetched from a memory unit (e.g., storage device 406). Components of the device 402 can include or use a microprocessor or a multi-core processor. A multi-core processor can include two or more processing units (e.g., processor 404) on a single computing component. Components of the device 402 can be based on any of these processors, or any other processor capable of operating as described herein. Processors can utilize instruction level parallelism, thread level parallelism, different levels of cache, etc. For example, the device 402 can include at least one logic device such as a computing device or server having at least one processor 404 to communicate. The components and elements of the device 402 can be separate components or a single component. The device 402 can include a memory component (e.g., storage device 406 or database 430) to store and retrieve data (e.g., values indicative of latency 416, sequence numbers 444). The memory can include a random access memory (RAM) or other dynamic storage device, coupled with the storage device 406 for storing information, and instructions to be executed by the device 402. The memory can include at least one read only memory (ROM) or other static storage device coupled with the storage device 406 for storing static information and instructions for the device 402. The memory can include a storage device 406, such as a solid state device, magnetic disk or optical disk, to persistently store information and instructions. Although shown as a single device 402, device 402 can include a plurality of servers, such as a server farm, cloud of virtual machines executed by one or more physical machines, or other type and form of computing devices. The device 402 can be the same as or substantially similar to computing device 100 of FIG. 1A, server 195 of FIG. 1B, and/or appliance 220 of FIGS. 2A-3.

The device 402 can include a processor 404. The processor 404 can include non-volatile memory that stores computer instructions and an operating system. For example, the computer instructions can be executed by the processor 404 out of volatile memory to perform all or part of the method 500. In some embodiments, the device 402 can include a non-transitory computer-readable medium, comprising instructions that, when executed by the processor 404 of the device 402, cause the processor 404 to perform all or part of the method 500. The processor 404 can be the same as or substantially similar to processor 105 of FIG. 1A.

The device 402 can collect and store certificates 417 received through communications with the plurality of servers 420. The certificates 417 can include SSL certificates 417. In embodiments, the device 402 can compare characteristics of the certificates 417 to determine or verify an authenticity of a certificate 417, including but not limited to, a signature or identifier from a certificate authority issuing the respective certificate 417 to the server 420.

The device 402 can measure and determine a value for latency 416 of communications with the plurality of servers 420 through one or more connections 442. The value of latency 416 can include a time delay between a transmission of data or information (e.g., request) and receiving a response to the transmission. The value 416 can include a time delay for traffic from the device 402 to one or more servers 420 through one or more connections 442. The device 402 can compare characteristics of traffic or data packets transmitted through one or more connections 442 to determine a value of latency 416 for the respective connections 442.

The device 402 can connect with and/or communicate with a DNS server 422 to identify an appropriate server 420 for a request 452 from a client 450 and an address of the server 420. The device 402 can transmit the request 452 indicating a requested server 420 (e.g., domain name) and the DNS server 422 can translate the domain name and/or identify an IP address of a requested server 420. The DNS server 422 can include a computing device (e.g., remote computing device), server, or hosted computing device providing one or more resources or applications. The DNS server 422 can be implemented using hardware or a combination of software and hardware. In embodiments, the DNS server 422 can be the same as or substantially similar to computer 100 of FIG. 1A and/or server 195 of FIG. 1B.

The device 402 can generate and/or assign sequence numbers 444 to connections 442 between client devices 450 and servers 420. The sequence number 444 can include a transmission control protocol (TCP) sequence number or identifier assigned to a connection 442 to identify the connection 442 from one or more other connections 442 between client devices 450 and servers 420. The device 402 can assign a unique sequence number 444 to each connection 442 and the sequence numbers 444 can be used to identify the respective connections 442.

The device 402 can include and maintain a database 430. The database 430 can include, store and maintain connection data, certificates 417, values of latency 416 measurements for one or more connections 442 and/or connection decisions 432. The database 430 can include an entry or table for servers 420 indicating one or more previous connection decisions 432 to the server 420, a certificate 417 associated with the server 420 and/or a latency 416 for communications with the server 420. In embodiments, the device 402 can update and maintain the database 430, for example, in real-time as the connection decisions 432 are made and as one or more connections 442 to servers 420 are monitored and managed. The database 430 can be the same as or substantially similar to storage device 406.

The data center 410 can include or execute a firewall 412 or network security system to manage and control communications through connections established through the data center 410. The firewall 412 can include or deploy one or more rules 414. The rules 414 can include rules to determine what traffic (e.g., internet traffic) is allowed, blocked or denied via the data center 410. The rules 414 can indicate configuration and/or logic of the data center 410 to manage and control traffic communicated through the data center 410, for example, through a backhauled connection. The rules 414 can include firewall settings 413 to apply the rules to a second connection 442 of the data center 410. In embodiments, the rules 414 can be applied to verify a certificate 417 and/or handshake communications during initiation or establishment of a connection 442. The device 402 can use feedback or outcomes from apply one or more rules 414 to traffic through the data center 410 to determine a security level of connections 442 from a branch office 408 and/or detect a security threat of connections 442 from a branch office 408.

The server 420 can be a computing device (e.g., a remote computing device), server, or hosted computing device providing one or more resources or applications. In embodiments, the server 420 can be the same as or substantially similar to computer 100 of FIG. 1A and/or server 195 of FIG. 1B. The server 420 can be implemented using hardware or a combination of software and hardware. For example, components of the server 420 can include logical circuitry (e.g., a central processing unit or CPU) that responds to and processes instructions fetched from a memory unit (e.g., storage device 406). Components of the server 420 can include or use a microprocessor or a multi-core processor. A multi-core processor can include two or more processing units (e.g., processor 404) on a single computing component. Components of the server 420 can be based on any of these processors, or any other processor capable of operating as described herein. Processors can utilize instruction level parallelism, thread level parallelism, different levels of cache, etc. For example, the server 420 can include at least one logic device such as a computing device or server having at least one processor 404 to communicate. The components and elements of the server 420 can be separate components or a single component. The server 420 can include a memory component (e.g., storage device 406) to store and retrieve data (e.g., certificates 417, rules 414). The memory can include a random access memory (RAM) or other dynamic storage device, coupled with the storage device 406 for storing information, and instructions to be executed by the server 420. The memory can include at least one read only memory (ROM) or other static storage device coupled with the storage device 406 for storing static information and instructions for the server 420. The memory can include a storage device 406, such as a solid state device, magnetic disk or optical disk, to persistently store information and instructions.

The server 420 can include a processor 404. The processor 404 can include non-volatile memory that stores computer instructions and an operating system. For example, the computer instructions can be executed by the processor 404 out of volatile memory to perform all or part of the method 500. In some embodiments, the server 420 can include a non-transitory computer-readable medium, comprising instructions that, when executed by the processor 404 of the server 420, cause the processor 404 to perform all or part of the method 500.

The client device 450 can be an end point, a computing device or a mobile device. The client device 450 can include or correspond to an instance of any client device, mobile device or computer device described herein. For example, the client device 450 can be the same as or substantially similar to computer 100 of FIG. 1A, and/or client 165 of FIG. 1B-2C. The client device 450 can be implemented using hardware or a combination of software and hardware. For example, components of the client device 450 can include logical circuitry (e.g., a central processing unit or CPU) that responds to and processes instructions fetched from a memory unit (e.g., storage device 406). Components of the client device 450 can include or use a microprocessor or a multi-core processor. A multi-core processor can include two or more processing units (e.g., processor 404) on a single computing component. Components of the client device 450 can be based on any of these processors, or any other processor capable of operating as described herein. Processors can utilize instruction level parallelism, thread level parallelism, different levels of cache, etc. For example, the client device 450 can include at least one logic device such as a computing device or server having at least one processor 404 to communicate. The components and elements of the client device 450 can be separate components or a single component. The client device 450 can include a memory component (e.g., storage device 406) to store and retrieve data (e.g., requests 452, connection decisions 432). The memory can include a random access memory (RAM) or other dynamic storage device, coupled with the storage device 406 for storing information, and instructions to be executed by the client device 450. The memory can include at least one read only memory (ROM) or other static storage device coupled with the storage device 406 for storing static information and instructions for the client device 450. The memory can include a storage device 406, such as a solid state device, magnetic disk or optical disk, to persistently store information and instructions.

The client device 450 can include a processor 404. The processor 404 can include non-volatile memory that stores computer instructions and an operating system. For example, the computer instructions can be executed by the processor 404 out of volatile memory to perform all or part of the method 500. In some embodiments, the client device 450 can include a non-transitory computer-readable medium, comprising instructions that, when executed by the processor 404 of the client device 450, cause the processor 404 to perform all or part of the method 500. The processor 404 can be the same as or substantially similar to processor 105 of FIG. 1A. The client device 450 can generate and transmit a request 452 to access a server 420 (e.g., remote computing device) and/or a resource or application of the server 420. The request 452 can indicate a server 420, an application, a resource, and/or a type of content.

The network 440 can include a public network, such as a wide area network (WAN) or the Internet, a private network such as a local area network (LAN) or a company Intranet, or a combination of a public network and a private network. The network 440 can employ one or more types of physical networks and/or network topologies, such as wired and/or wireless networks, and may employ one or more communication transport protocols, such as transmission control protocol (TCP), internet protocol (IP), user datagram protocol (UDP) or other similar protocols. In some embodiments, the network 440 can include a WiFi network. The network 440 can include a virtual private network (VPN). The VPN can include one or more encrypted connections 442 between an client device 450, server 420, and/or device 402 over network 440 (e.g., internet, corporate network, private network). In some embodiments, a client device 450, server 420, and/or device 402 may be on the same network 440. In some embodiments, one or more of a client device 450, device 402 and/or server 420 may be on different networks 440. The network 440 can be the same or substantially similar to cloud 175 of FIG. 1B.

The connection 442 can provide an application session, a browser session, a remote application session, virtual desktop session, virtual application session, and/or web application session. In embodiments, a connection 442 can enable or provide a virtual desktop session from a client application of a client device 450 to a hosted application of a server 420 (e.g., virtual machine). The connections 442 can be established using a communication protocol, including but not limited to, IEEE 202.11 based protocol, Bluetooth based protocol, WiFi based protocol or cellular based protocol. The connections 442 can include encrypted and/or secure sessions established between a client device 450, device 402 and/or server 420. The encrypted connection 442 can include an encrypted file, encrypted data or traffic transmitted between a client device 450, device 402 and/or server 420.

Figure 5:
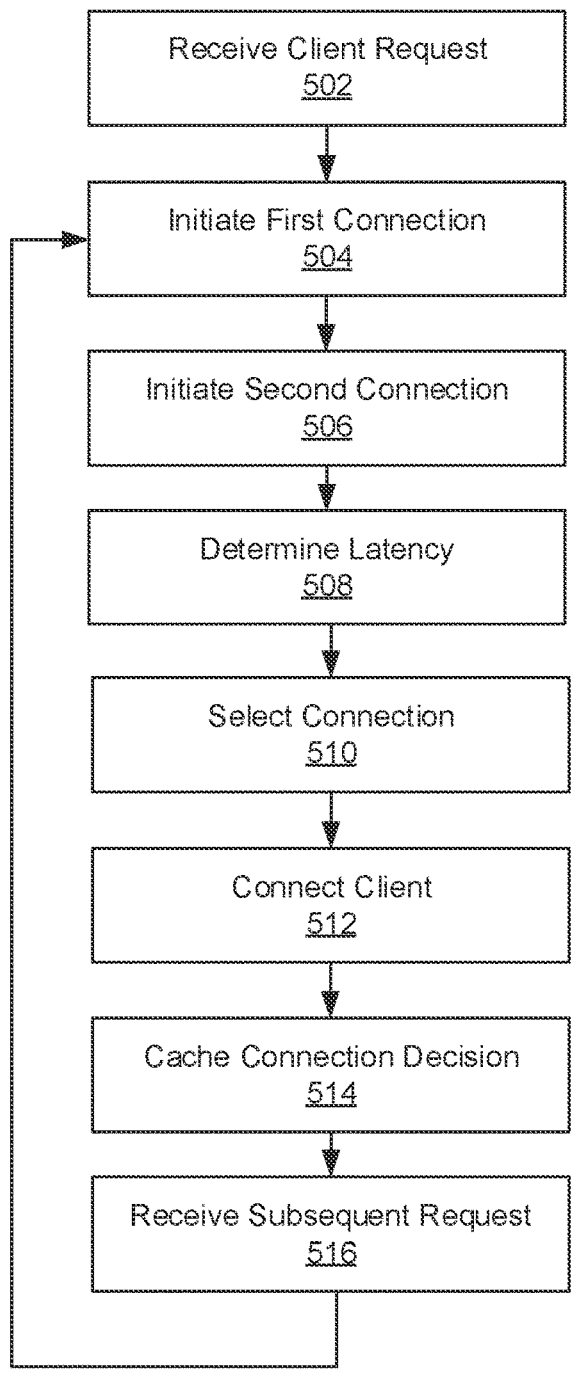
FIG. 5 is a flow diagram of a method for intelligent path selection to reduce latency, in accordance with an illustrative embodiment.

Referring now to FIG. 5, depicted is a flow diagram of one embodiment of a method 500 for intelligent path selection to reduce latency. In brief overview, the method 500 can include one or more of: receiving a client request (502), initiating a first connection (504), initiating a second connection (506), determining a value of latency (508), selecting a connection (510), connecting the client (512), caching a connection decision (514), and receiving a subsequent request (516). The functionalities of the method 500 may be implemented using, or performed by, the components detailed herein in connection with FIGS. 1-4.

Now referring to (502), and in some embodiments, a request from a client can be received or transmitted. A client device 450 can transmit a request 452 to access a server 420 (e.g., remote computing device) to device 402. The request 452 can include a DNS request and can be routed or forwarded to a DNS server 422 by device 402 (e.g., host device, proxy device, router). The device 402 can access or request a server from the DNS server 422 to handle the client request 452. The request 452 can indicate a server, domain name and/or type of content. The DNS server 422 can perform a look up or to identify an address (e.g., IP address) of a server 420 for the request 452. In embodiments, the DNS server 422 can determine or identify the IP address of the requesting client device 450 and select a server based in part on a distance (e.g., nearest, closest) or geographical area of the IP address of the client device 450 and an IP address of the selected server 420. In some embodiments, the DNS server 422 can select a POP server 420 based in part on the client request 452, the IP address of the client device 450 and an IP address of the selected server 420. In one embodiment, the DNS server 422 can select the server 420 expecting or for a direct connection from a branch office 408 (e.g., local branch office) to the server 420. The branch office 408 may be in the same or similar geographical area as the client device 450. The DNS server 422 can transmit a response including the IP address information for the selected server 420 to the device 402 (e.g., host device, proxy device, router) and/or the client device 450. In some embodiments, the device 402 can transmit the response including the IP address for the selected server to the client device 450.

Now referring to (504), and in some embodiments, a first connection can be initiated to the server 420. The device 402 can initiate a connection 442 to the selected server 420, for example, through network 440. In embodiments, the client device 450 can initiate a connection 442 with the selected server 420 using a handshake (e.g., transport layer security (TLS) handshake) through the device 402 to the server 420. The device 402 can break out or initiate the connection 442 (e.g., first connection) directly from a branch office 408 and outside of the data center 410. The device 402 can also assign or generate a first sequence number 444 (e.g., TCP sequence number) for the first connection 442.

Now referring to (506), and in some embodiments, a second connection can be initiated. The device 402 can initiate connections 442 to a plurality of servers 420 or a plurality of remote computing devices 420. The connections 442 can include one connection 442 (e.g., first connection) to a first computing device 420 and another connection 442 (e.g., second connection) to a second remote computing device 420. The traffic via the another connection 442 can be controllable by application of at least one rule 414 of a network security system (e.g., data center 410). In some embodiments, the first remote computing device 420 and the second remote computing device 420 can correspond to the same remote computing device 420 (or server) or different remote computing devices 420. The device 402 can initiate connections 442 to one or more different servers 420, for example, until the device 402 can authenticate or verify that the server 420 connected via the first connection 442 (e.g., break out connection from branch office 408) is a non-malicious server 420 (e.g., a computing device requested by the client device 450) and not a fraudulent actor (e.g., man-in-the middle attack). Thus, the device 402 can initiate the first connection 442 to a server 420 directly from the branch office 408 and outside the data center 410. The device 402 can also initiate second connection 442 to a server 420 through the data center 410 and compare characteristics of the connections 442 to determine if the server 420 connected through the first and second connections 442 is the same server 420 or if one of the first or second connections 442 have been attacked and the servers 420 are different.

The device 402 can initiate the second connection 442 to the selected server 420 responsive to the client request 452 and through a data center 410 (e.g. network security system, gateway, firewall 412). The second connection 442 can include a duplicate, backup or secondary connection to the first connection 442, for example, to verify characteristics of the first connection 442, the intended server 420 (e.g., remote computing device, intended destination) and/or in case of a security threat or attack on the first connection 442. In embodiments, the device 402 can initiate the second connection responsive to performing the handshake for the first connection 442 to the server 420. In some embodiments, the device 402 can initiate the second connection in parallel with the first connection, at the same time or substantially the same time as initiating the first connection 442 to the server 420. The device 402 can backhaul the second connection 442 through the data center 410 to apply or use one or more rules 414 of the data center 410 and determine a security level of the first connection 442 and the second connection 442.

In some embodiments, the device 402 can initiate the second connection 442 to a second server 420 (e.g., second remote computing device) or refer to the server connected via the second connection 442 as a second server 420 until the server 420 connected via the first connection 442 can be authenticated or verified. The device 402 can use the second connection 442 to verify or otherwise authenticate the server 420 connected via the first connection 442 to confirm that the same server 420 is connected via both the first connection 442 and the second connection 442 and prevent an attack or fraudulent actor on the first connection 442 (e.g., man-in-the-middle attack). In embodiments, the device 402 can transmit, via the data center 410, data packets or probing connections through the second connection 442 to verify a security level of the first connection 442 and the second connection 442. The device 402 can observe outcomes or check if one or more rules 414 of the data center 410 are applied to the data packets or probing connections indicating the data packets or probing connections were blocked, prevented or denied at the data center 410 and may correspond to a security threat.

The device 402 can generate a second sequence number 444 (e.g., TCP sequence number) for the second connection 442 that is associated with or corresponds to the first sequence number 444 for the first connection 442. In embodiments, the second sequence number 444 can include a rotated version of the first sequence number 444, a shifted version (e.g., circular shift) of the first sequence number 444 and/or a modified version of the first sequence number 444. The device 402 can generate unique sequence numbers 444 for each connection 442 to identify the respective connection 442 and/or traffic communicated through the respective connection 442. The sequence number 444 for the second connection 442 can be a rotated or modified version of the sequence number 442 for the first connection 442 for the device 402 to identify a relationship between the first connection 442 and the second connection 442. In embodiments, the device 402 can use the sequence numbers 444 to identify the respective connections 442 and compare the characteristics of the traffic received through the connections 442.

Now referring to (508), and in some embodiments, a value of latency of a given connection can be determined. The device 402 can determine and store a value of latency or delay 416 in communications through the first connection 442 and the second connection 442. The device 402 can compare time characteristics of traffic or data packets transmitted through the first connection 442 and the second connection 442 to determine the values of latency 416 for the first connection 442 and the second connection 442. In some embodiments, the measured data packets can include packets transmitted during establishment of the respective connection 442 between the device 402 and a server 420. For example, the device 402 can measure the latency 416 during transmission of SYN packets and SYN-ACK packets when initiating the connection 442. The device 402 can transmit a SYN packet (e.g., synchronization packet) to a server 420 to test the ability to access the server 420 and indicate to the server 420 that the device 402 wants to begin the connection negotiation process for data exchange. The device 402 may receive a SYN-ACK packet (e.g., synchronization and acknowledgment) from the server 420 acknowledging receipt of the SYN packet. The device 402 can measure or determine a time between transmission of the SYN packet and receipt of the SYN-ACK packet over a connection 442 to determine the value of the latency of the respective connection 442.

In some embodiments, the device 402 can determine the latency 416 or a delay in the exchange of data via the connections 442 based in part on feedback about the application of the at least one rule 414. The rule 414 can be applied to a data packet or communications through the connections 442 during the establishment of the connection 442. The device 402 can transmit a data packet to a server 420 and determine if a rule 414 (e.g., allow rule, deny rule) was applied or used during the transmission of the data packet, for example, through a data center 410 via the second connection 442. The rule 414 can include, but is not limited to, a certificate comparison, a firewall setting of the firewall 412 of the data center 410, and/or a response to a handshake with the server 420 or remote computing device 420. The rule 414 can include an allow rule, deny rule and/or inspect rule applied or matched to portions of traffic through the second connection 442 and the data center 410. In embodiments, if the data packet was blocked or prevented by the rule 414 (e.g., deny rule) at the data center 410, this can indicate the server 420 may be untrustworthy, for example, corresponding to a DNS spoofing attack or man-in-the-middle attack. In embodiments, if the data packet was allowed by the rule 414 (e.g., allow rule) at the data center 410, this can indicate the server 420 may be trustworthy and the connection 442 having the lowest latency 416 can be selected to connect the client device 450 to the server 420. The device 402 can measure or determine a time between transmission of the data packet and a response from a server 420 and/or a response from the data center indicating that a rule 414 (e.g., packet was passed to server, packet was denied at data center) was applied or used during the transmission of the data packet to determine the value of the latency of the respective connection 442.

Now referring to (510), and in some embodiments, a connection can be selected. The device can select at least one of the first connection 442 or the second connection 442 responsive to determining that the traffic through the data center 410 was not blocked, prevented or denied by a rule 414 of the data center 410 and having the lowest latency. The device 402 can determine the connection 442 having the lowest latency 416 or delay in communications. In embodiments, if the server 420 is trustworthy, the device 402 can select at least one of the first connection 442 or the second connection 442 based on a latency 416 of the respective connection 442. In embodiments, if the first connection 442 from the branch office 408 has a lower latency 416, the device 402 can select the first connection 442 from the branch office 408 and directly break out traffic from the client device 450 to the server 420 through the first connection 442. In embodiments, if the second connection 442 has a lower latency 416, the device 402 can select the second connection 442 through the data center 410 and backhaul traffic from the client device 450 to the server 420 through the second connection 442.

Now referring to (512), and in some embodiments, the client device can be connected to the server. The device 402 can connect the client device 450 to one of the plurality of servers 420 or remote computing devices 420 via at least the first connection 442 or the second connection 442 based in part on the determined delay (e.g., latency 416) in the exchange of data via the connections 442. The device 402 can connect the client device 450 to a server 420 or remote computing device 420 via the selected connection 442 after determining the latency 416 of the respective of connection 442 and the server 420 is trustworthy, secure or safe using feedback from the second connection 442. In embodiments, if the first connection 442 is selected, the device 402 can connect the client device 450 to the server 420 through the first connection 442 and from the branch office 408 through the network 440. The client 450 can access and/or communicate with the server 420 through the first connection 442. In embodiments, if the second connection 442 is selected, the device 402 can connect the client device 450 to the server 420 through the second connection 442 and through the data center 410. The client 450 can access and/or communicate with the server 420 through the second connection 442 and through the data center 410.

Referring now to (514) and in some embodiments, a connection decision can be stored or cached. The device 402 can store and maintain a database 430 of the connection decisions 432, for example, to apply to a subsequent request 452 to the same server 420 or remote computing device 420. In embodiments, after the device 402 makes a decision or selection to directly branch out or backhaul a connection 442 to a server 420, the device 402 can cache the connection decision 432 with a time out value and can apply it to future or subsequent connection requests 452 to the same server 420, remote computing device 420 or destination. The connection decision 432 can indicate one or more connections 442 selected for a server 420, one or more connections 442 rejected for a server 420, and/or a latency 416 of one or more connections 442 at the time of the connection decision 432. The device 402 can organize the connection decisions 432 in the database 430 by server 420 and/or remote computing device 420 associated with the connection decision 432.

Now referring to (516), and in some embodiments, a subsequent request can be received. The device 402 can receive a subsequent request 452 from a client device 450 to access a server 420 or remote computing device 420. The device 402 can determine if a client device 450 has previously requested access to the server 420 or remote computing device 420 and if a connection decision 432 for the server 420 or remote computing device 420 is cached in the database 430. In some embodiments, the device 402 can do a lookup, for example using an identifier or IP address of the server 420 or remote computing device 420 to determine if a connection decision 432 for the server 420 or remote computing device 420 is cached in the database 430.

If no connection decision 432 is cached for the requested server 420 (or remote computing device 420), the method 500 can go to (504) to initiate a first connection 442. If a connection decision 432 is cached for the requested server 420, the device 402 can verify a certificate 417 of the requested destination (e.g., verify same server SSL certificate) through communications with the requested server 420. The device 402 can compare the certificate 417 received with a previous certificate 417 and/or certificate data 417 stored in the database 430 with the cache decision 432 to verify if the server 420 is the same and/or still trustworthy or secure. In embodiments, if the certificates 417 match, the device 402 can apply the cached connection decision 432 to the subsequent request 452 and directly break out the connection 442 from the branch office 408 or backhaul the connection 442 though the data center 410 based on the cached connection decision 432. In embodiments, if the certificates 417 do not match, the device 402 can backhaul the connection 442 through the data center 410 for the subsequent connection 442 or make a new connection decision based in part on a current latency 416 of the possible connection paths. In embodiments, if the certificates 417 do not match, the method 500 can go to (504) to initiate a first connection 442 and select at least one connection 442 to the requested server 420.

Figure 6:
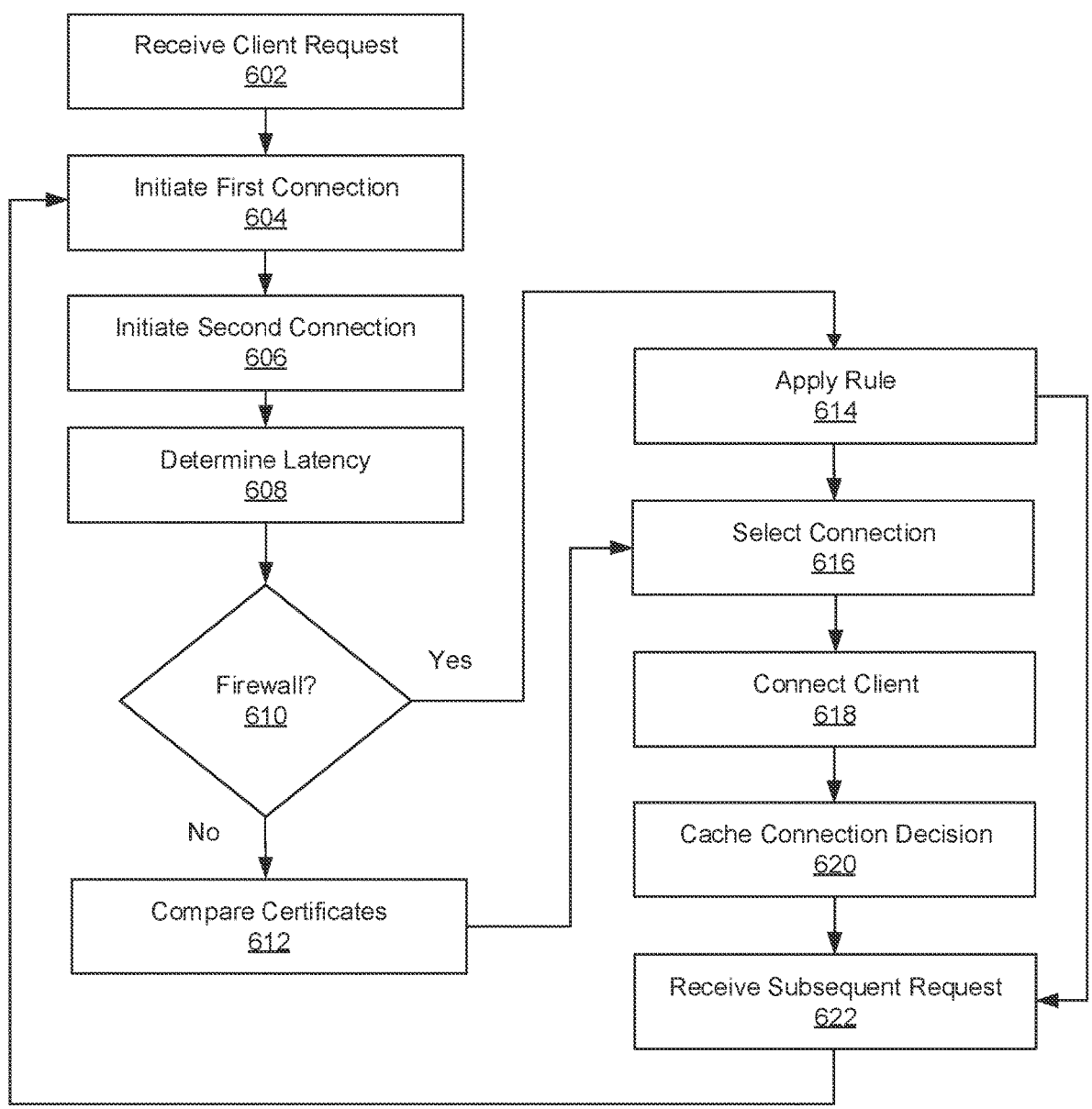
FIG. 6 is a flow diagram of a method for intelligent path selection to maintain security, in accordance with an illustrative embodiment.

Referring now to FIG. 6, depicted is a flow diagram of one embodiment of a method 600 for intelligent path selection to maintain security. In brief overview, the method 600 can include one or more of: receiving a client request (602), initiating a first connection (604), initiating a second connection (606), determining a value of latency (608), determining if the data center includes a firewall (610), comparing certificates (612), apply a rule (614), selecting a connection (616), connecting the client (618), caching a connection decision (620), and receiving a subsequent request (622). The functionalities of the method 600 may be implemented using, or performed by, the components detailed herein in connection with FIGS. 1-4.

Now referring to (602), and in some embodiments, a request from a client can be received or transmitted. A client device 450 can transmit a request 452 to access a server 420 to device 402 and the request 452 can include a DNS request and can be routed or forwarded to a DNS server 422 by device 402. The device 402 can access or request a server from the DNS server 422 to handle the client request 452. The request 452 can indicate a server, domain name and/or type of content. The DNS server 422 can perform a look up or to identify an address (e.g., IP address) of a server 420 for the request 452. In embodiments, the DNS server 422 can determine or identify the IP address of the requesting client device 450 and select a server based in part on a distance (e.g., nearest, closest) or geographical area of the IP address of the client device 450 and an IP address of the selected server 420. In some embodiments, the DNS server 422 can select a POP server 420 based in part on the client request 452, the IP address of the client device 450 and an IP address of the selected server 420. In one embodiment, the DNS server 422 can select the server 420 expecting or for a direct connection from a branch office 408 (e.g., local branch office) to the server 420. The branch office 408 may be in the same or similar geographical area as the client device 450. The DNS server 422 can transmit a response including the IP address information for the selected server 420 to the device 402 (e.g., host device, proxy device, router) and/or the client device 450. In some embodiments, the device 402 can transmit the response including the IP address for the selected server to the client device 450.

Now referring to (604), and in some embodiments, a first connection can be initiated to the server 420. The device 402 can initiate a connection 442 to the selected server 420, for example, through network 440. In embodiments, the client device 450 can initiate a connection 442 with the selected server 420 using a handshake (e.g., transport layer security (TLS) handshake) through the device 402 to the server 420. The device 402 can break out or initiate the connection 442 (e.g., first connection) directly from a branch office 408 and outside of the data center 410. The device 402 can also assign or generate a first sequence number 444 (e.g., TCP sequence number) for the first connection 442.

Now referring to (606), and in some embodiments, a second connection can be initiated. The device 402 can initiate connections 442 to a plurality of servers 420 or a plurality of remote computing devices 420. The connections 442 can include one connection 442 (e.g., first connection) to a first computing device 420 and another connection 442 (e.g., second connection) to a second remote computing device 420. The traffic via the another connection 442 can be controllable by application of at least one rule 414 of a network security system (e.g., data center 410). In some embodiments, the first remote computing device 420 and the second remote computing device 420 can correspond to the same remote computing device 420 (or server) or different remote computing devices 420. The device 402 can initiate connections 442 to one or more different servers 420, for example, until the device 402 can authenticate or verify that the server 420 connected via the first connection 442 (e.g., break out connection from branch office 408) is a non-malicious server 420 (e.g., a computing device requested by the client device 450) and not a fraudulent actor (e.g., man-in-the middle attack). Thus, the device 402 can initiate the first connection 442 to a server 420 directly from the branch office 408 and outside the data center 410. The device 402 can also initiate second connection 442 to a server 420 through the data center 410 and compare characteristics of the connections 442 to determine if the server 420 connected through the first and second connections 442 is the same server 420 or if one of the first or second connections 442 have been attacked and the servers 420 are different.

The device 402 can initiate the second connection 442 to the selected server 420 responsive to the client request 452 and through a data center 410 (e.g. network security system, gateway, firewall 412). The second connection 442 can include a duplicate, backup or secondary connection to the first connection 442, for example, to verify characteristics of the first connection 442, the intended server 420 (e.g., remote computing device, intended destination) and/or in case of a security threat or attack on the first connection 442. In embodiments, the device 402 can initiate the second connection responsive to performing the handshake for the first connection 442 to the server 420. In some embodiments, the device 402 can initiate the second connection in parallel with the first connection, at the same time or substantially the same time as initiating the first connection 442 to the server 420. The device 402 can backhaul the second connection 442 through the data center 410 to apply or use one or more rules 414 of the data center 410 and determine a security level of the first connection 442 and the second connection 442.

In some embodiments, the device 402 can initiate the second connection 442 to a second server 420 (e.g., second remote computing device) or refer to the server connected via the second connection 442 as a second server 420 until the server 420 connected via the first connection 442 can be authenticated or verified. The device 402 can use the second connection 442 to verify or otherwise authenticate the server 420 connected via the first connection 442 to confirm that the same server 420 is connected via both the first connection 442 and the second connection 442 and prevent an attack or fraudulent actor on the first connection 442 (e.g., man-in-the-middle attack). In embodiments, the device 402 can transmit, via the data center 410, data packets or probing connections through the second connection 442 to verify a security level of the first connection 442 and the second connection 442. The device 402 can observe outcomes or check if one or more rules 414 and/or firewall settings 413 of the data center 410 are applied to the data packets or probing connections indicating the data packets or probing connections were blocked, prevented or denied at the data center 410 and may correspond to a security threat.

The device 402 can generate a second sequence number 444 (e.g., TCP sequence number) for the second connection 442 that is associated with or corresponds to the first sequence number 444 for the first connection 442. The device 402 can generate sequence numbers 444 for each connection 442 and the sequence numbers 444 can be unique to the respective connection 442, for example, for the device 402 to identify the respective connection 442. In embodiments, the second sequence number 444 can include a rotated version of the first sequence number 444, a shifted version (e.g., circular shift) of the first sequence number 444 and/or a modified version of the first sequence number 444. The device 402 can generate the second sequence number 444 to be a modified version of the first sequence number 444 such that the sequence numbers are different and still indicate a relationship. The relationship can include or indicate that the connections 442 were initiated in response to the same request 452 and/or intended for the same server 420. The device 402 can use the sequence numbers 444 to identify the connections 442 and compare characteristics of the respective connections 442.

Now referring to (608), and in some embodiments, a value of latency of a given connection can be determined. The device 402 can determine and store a value of latency or delay 416 in communications through the first connection 442 and the second connection 442. The device 402 can compare time characteristics of traffic or data packets transmitted through the first connection 442 and the second connection 442 during initiation of the connections to determine a value of the latency of the respective connection. In embodiments, the device 402 can transmit data packets to a server 420 through a connection 442 and measure a time or delay in receiving a response from the server 420 through the connection 442 and the time or delay can correspond to the value of the latency of the connection 442. In embodiments, the device 402 can measure or determine a time between transmission of a SYN packet to a server 420 over a connection 442 and receipt of the SYN-ACK packet over the connection 442 to determine the value of the latency of the respective connection 442.

Now referring to (610), and in some embodiments, a determination can be made if the data center includes a firewall. The device 402 can determine if the data center 410 includes or deploys a firewall 412. In embodiments, the device 402 can access or receive configuration data for the data center 410 indicating if the data center 410 includes or deploys a firewall 412. If the data center 410 does not include a firewall 412, the method 600 can go to (612) to compare certificates. If the data center 410 does include a firewall 412, the method 600 can go to (614) to apply a rule 414 to communications through the data center 410.

Now referring to (612), and in some embodiments, certificates can be compared. The device 402 can determine if a certificate 417 (e.g., SSL certificate) received or communicated through the first connection 442 matches, is similar to or corresponds to a certificate 417 received or communicated through the second connection 442 to determine the security level of the first connection 442 and second connection 442. If the certificates do not match, the device 402 can determine that at least one connection 442 is under attack or being spoofed by a bot or fraudulent actor, for example, as part of a DNS spoofing attack, server spoofing attack or man-in-the-middle attack. For example, the device 402 can determine that a certificate 417 received or communicated through the first connection 442 is different from a certificate 417 received or communicated through the second connection 442. The different certificates 417 may indicate that the server 420 accessed through the first connection 442 is not trustworthy and/or the first connection 442 is under attack or poses a security threat. In some embodiments, the different certificates 417 can indicate that the server 420 communicated with through the first connection 442 is different form the server 420 communicated with through the second connection 442 or can indicate a DNS spoofing attack or man-in-the-middle attacks through the first connection 442. In embodiments, if the certificates 417 do not match, the device 402 can select the second connection 442 through the data center 410 and backhaul traffic through the data center 410 to for communications between the client device 450 and the server 420. The method 600 can go to (616) to select the connection 442 to connect the client device 450 to the server 420.

In embodiments, the device 402 can determine that a certificate 417 received or communicated through the first connection 442 matches, is the same as, similar or corresponds to a certificate 417 received or communicated through the second connection 442. In embodiments, if the certificates 417 match, the device 402 can determine the server 420 is trustworthy and/or the first connection 442 is safe. For example, the device 402 can determine that the server 420 communicated with through the first connection 442 is the same server 420 communicated with through the second connection 442 as both connections provided the same certificate 417. The device 402 can select at least one of the first connection 442 or the second connection 442 based on a latency 416 of the respective connection 442. The device 402 can select the connection 442 having the lower latency 416 after or responsive to confirming that the certificates 417 match and both the first connection 442 and the second connection 442 are secure or not under an attack. In embodiments, if the first connection 442 from the branch office 408 has a lower latency 416 and the certificates 417 match between the connections 442, the device 402 can select the first connection 442 from the branch office 408 and directly break out traffic from the client device 450 to the server 420 through the first connection 442. In embodiments, if the second connection 442 has a lower latency 416 and the certificates 417 match between the connections 442, the device 402 can select the second connection 442 through the data center 410 and backhaul traffic from the client device 450 to the server 420 through the second connection 442. The method 600 can go to (616) to select the connection 442 to connect the client device 450 to the server 420.

Now referring to (614), and in some embodiments, a rule can be applied to communications through the data center. The data center 410 can include a firewall 412 that executes or applies one or more rules 414 to traffic through the data center 410 to control (e.g., allow, prevent) traffic through the data center 410, for example to a server 420 and/or a client device 450. In embodiments, if a rule 414 matches to traffic through the data center 410 this can indicate that the rule 414 was applied to the traffic to allow the traffic or deny the traffic. The rules 414 can include but are not limited to, deny rule, inspect rule, and/or an allow rule. The device 402 can apply the one or more rules 414 to traffic through the second connection that includes the data center 410 to determine the security level of the first connection 442 and second connection 442. The device 402 can determine a security level of the first connection 442 and second connection 442 based in part on feedback (e.g., rules 414) applied through the second connection 442 and the data center 410. The feedback can include, but is not limited to, certificate data, rule matches, firewall settings and/or handshake communications to implement rules 414 of a firewall 412 to traffic of the second connection 442 for the first connection 442 from the branch office 408. If a rule 414 is applied to traffic (e.g., matches), the application of the rule 414 can indicate an issue or potential security threat with the respective traffic, a device the traffic was received from and/or transmitted from. For example, if a deny rule 414 is applied to traffic to block or prevent the traffic, the application of the deny rule 414 can indicate the traffic is corrupt or was transmitted from a fraudulent actor.

In embodiments, a deny rule 414 may be applied to traffic through the second connection 442 and the data center 410. The device 402 can determine to reject the first connection 442, the second connection 442 or both the first connection 442 and the second connection 442 responsive to determining that traffic through the data center 410 during initiation and/or a handshake process was blocked, prevented or denied by one or more rules 414 of the data center 410. The device 402 can determine if a deny rule 414 was applied to portions of traffic communicated through the second connection 442 and data center 410. The application of the deny rule can indicate that the traffic was blocked, prevented or denied at the data center 410 and that there is a security issue or attack from the server 420 or fraudulent actor impersonating the intended server 420 (e.g., DNS spoofing, man-in-the-middle attack) through communications via the first connection 442 and/or second connection 442. In some embodiments, the rule 414 (e.g., a deny rule) can be applied in response to handshake communications through the first connection 442 and second connection 442 during initiation or establishment of the respective connection 442.

The device 402 can use communications and/or handshake to determine the security level of the server 420 communicating through the first connection 442 and the server 420 communicating through the second connection 442. The device 402 can determine if an appropriate response was received during handshake communications with the server 420, including but not limited to if a SYN-ACK was received for a TCP SYN request, a server hello was received for a SSL client hello, or a FIN RST packet was received after connection initiation or establishment, to determine the security level of the first connection 442 and second connection 442. If a response was not received or an incorrect response was received, the data center 410 may apply a deny rule 414 to the traffic communicated by the server 420. In one embodiment, the device 402 can reject the first connection 442 through the branch office 408 if at least one of a SYN-ACK received for a TCP SYN request, a server hello received for a SSL client hello, or a FIN RST packet received after connection establishment, were not received during communications with the server 420 through the first connection 442. The device 402 can perform a handshake with the server 420 (or remote computing device) through the second connection 442 and determine to reject the first connection 442 to the server 420 responsive to and/or based in part on the handshake with the server 420 (or remote computing device) through the second connection 442. For example, the device 402 can use the feedback of the second connection 442 during the handshake to determine no response was received to a synchronization packet or incorrect packet was received and determine the server 420 may be a security issue or under attack and reject the first connection 442. In some embodiments, the device 402 can use the feedback of the second connection 442, here that the deny rule 414 was applied, and disconnect both the first connection 442 and the second connection 442 to the server 420 and reject the client request 452 for access to the server 420, for example, if the deny rule 414 indicates that both connections 442 may be compromised or a security issue. The device 402 can transmit a notification or indication to the client device 450 indicating that the request 452 was rejected. The method 600 can go to (604) and the device 402 can wait for a subsequent request 452 from a client device 450.

In embodiments, the device 402 can determine that an allow rule 414 was applied to traffic through the second connection 442 and the data center 410. The allow rule 414 can indicate that traffic was allowed through the second connection 442 and data center 410 and the first connection 442 and/or second connection 442 are trustworthy, secure or safe. The device 402 can use the feedback of the second connection 442 and the data center 410 indicating that the allow rule 414 was applied to traffic received from the server 420 to determine that the server 420 is trustworthy and determine that the first connection 442 is secure as it is connected to the same server 420. If an allow rule 414 was applied to the traffic, the device 402 can select the connection 442 having the lower latency 416. In embodiments, if the first connection 442 from the branch office 408 has a lower latency 416 and a security of the first connection 442 is verified, the device 402 can select the first connection 442 from the branch office 408 and directly break out traffic from the client device 450 to the server 420 through the first connection 442. In embodiments, if the second connection 442 has a lower latency 416, the device 402 can select the second connection 442 through the data center 410 and backhaul traffic from the client device 450 to the server 420 through the second connection 442. The method 600 can go to (616) to connect the client device 450 to the server 420 through the selected connection 442.

In some embodiments, if the allow rule 414 is applied to traffic through the second connection 442, the device 402 can compare certificates 417 received through the first connection 442 and the second connection 442 to confirm an identity of the server 420 and if the server 420 is trustworthy. The device 402 can compare the certificate 417 received from the server 420 through the first connection 442 to the certificate 417 received from the server 420 through the second connection 442. If the certificates do not match, the device 402 can determine that at least one connection 442 is under attack or being spoofed by a bot or fraudulent actor, for example, as part of a DNS spoofing attack, server spoofing attack or man-in-the-middle attack. In embodiments, if the certificates 417 do not match, the device 402 can select the second connection 442 through the data center 410 and backhaul traffic through the data center 410 to for communications between the client device 450 and the server 420. The method 600 can go to (616) to connect the client device 450 to the server 420 through the selected connection 442 (e.g., second connection 442). In embodiments, the device 402 can determine that a certificate 417 received or communicated through the first connection 442 matches, is the same as, similar or corresponds to a certificate 417 received or communicated through the second connection 442. In embodiments, if the certificates 417 match, the device 402 can select at least one of the first connection 442 or the second connection 442 based on a latency 416 of the respective connection 442. The device 402 can select the connection 442 having the lower latency 416 after or responsive to confirming that the certificates 417 match and both the first connection 442 and the second connection 442 are secure or not under an attack. The method 600 can go to (616) to select the connection 442 to connect the client device 450 to the server 420.

In embodiments, the device 402 can determine if an inspect rule 414 of the data center firewall 412 was applied to traffic through the second connection 442. The inspect rule 414 can indicate an interception (e.g., an SSL interception) or a man-in-the middle attack via the respective connection 442. In some embodiments, the device 402 can determine or verify that an inspect rule 414 was applied by comparing SSL certificates 417 communicated through the first connection 442 and second connection 442 to determine if the certificates 417 are signed by the same device, server 420, remote computing device 420 or enterprise device (e.g., enterprise certificate authority). If the inspect rule 414 was applied indicating a security issue or attack via the first connection 442, the device 402 can reject or disconnect the first connection and reject the request 452 to access the server 420. In some embodiments, the device 402 may maintain the second connection 442 to backhaul traffic through the data center 410 to continue the interception responsive to the inspect rule 414. The method 600 can go to (602) and the device 402 can wait for a subsequent request 452 from a client device 450.

Now referring to (616), and in some embodiments, a connection can be selected. In embodiments, the device 402 can select at least one of the first connection 442 or the second connection 442 responsive to determining that the traffic through the data center 410 was not blocked, prevented or denied by at least one rule 414 of the data center 410. The device 402 can determine that the server 420 communicated with through the first connection 442 and the second connection 442 is trustworthy and therefore, the connections 442 to the server 420 are secure or safe. The device 402 can use the feedback of the second connection 442, for example, that the traffic was allowed through the data center 410, to determine that the first connection 442 and/or the server 420 connected via the first connection 442 is trustworthy, secure and/or safe. The feedback can include that the server 420 provided the correct certificate and/or that the server 420 provided the correct responses during the handshake process with the server 420 through the second connection 442. The feedback can indicate that traffic received from the server 420 through the second connection 442 is allowed through the data center 410 and/or a firewall 412 of the data center 410 without being blocked, prevented or otherwise denied via the application of one or more rules 414. In embodiments, if the server 420 is trustworthy and/or the first connection 442 is safe, the device 402 can select at least one of the first connection 442 or the second connection 442 based on a latency 416 of the respective connection 442. The device 402 can select the connection 442 having the lower latency 416. In embodiments, if the first connection 442 from the branch office 408 has a lower latency 416 and a security of the first connection 442 is verified, the device 402 can select the first connection 442 from the branch office 408 and directly break out traffic from the client device 450 to the server 420 through the first connection 442. In embodiments, if the second connection 442 has a lower latency 416, the device 402 can select the second connection 442 through the data center 410 and backhaul traffic from the client device 450 to the server 420 through the second connection 442.

In some embodiments, if the certificates 417 do not match, the device 402 can select the second connection 442 through the data center 410 and backhaul traffic through the data center 410 to for communications between the client device 450 and the server 420. For example, the device 402 can verify the certificate 417 received from the server 420 through the second connection 442 using the one or more rules 414 of the firewall 412 at the data center 410. In embodiments, the rules 414 can include or indicate a signature for the certificate 417 and a signature of the certificate 417 received from the server 420 through the second connection 442 can be compared the signature (e.g., Enterprise CA signature) maintained at the firewall 412 to verity the certificate 417 received from the server 420 is correct. If the certificate 417 received from a server 420 (or fraudulent actor) through the first connection 442 is different from the certificate 417 received via the second connection 442, the device 402 can determine the first connection 442 is under attack or vulnerable to attack. The device 402 can disconnect the first connection 442 and select the second connection 442 to connect the client device 450 to the server 420.

Now referring to (618), and in some embodiments, the client device can be connected to the server. The device 402 can connect the client device 450 to one of the plurality of servers 420 or remote computing devices 420 via at least the first connection 442 or the second connection 442 based in part on the determined delay (e.g., latency 416) in the exchange of data via the connections 442 and/or a security level of the server 420 accessed via the respective connection 442. The device 402 can connect the client device 450 to a server 420 or remote computing device 420 via the selected connection 442 after determining the latency 416 of the respective of connection 442 and verifying the connection 442 and/or server 420 is trustworthy, secure or safe using feedback from the second connection 442.

In embodiments, if the first connection 442 is selected, the device 402 can connect the client device 450 to the server 420 through the first connection 442 and from the branch office 408 through the network 440. The client 450 can access and/or communicate with the server 420 through the first connection 442. In embodiments, if the second connection 442 is selected, the device 402 can connect the client device 450 to the server 420 through the second connection 442 and through the data center 410. The client 450 can access and/or communicate with the server 420 through the second connection 442 and through the data center 410.

Referring now to (620) and in some embodiments, a connection decision can be stored or cached. The device 402 can store and maintain a database 430 of the connection decisions 432, for example, to apply to a subsequent request 452 to the same server 420 or remote computing device 420. In embodiments, after the device 402 makes a decision or selection to directly branch out or backhaul a connection 442 to a server 420, the device 402 can cache the connection decision 432 with a time out value and can apply it to future or subsequent connection requests 452 to the same server 420, remote computing device 420 or destination. The connection decision 432 can indicate one or more connections 442 selected for a server 420, one or more connections 442 rejected for a server 420, a certificate 417 associated with the server 420, and/or a latency 416 of one or more connections 442 at the time of the connection decision 432. The device 402 can organize the connection decisions 432 in the database 430 by server 420 and/or remote computing device 420 associated with the connection decision 432.

Now referring to (622), and in some embodiments, a subsequent request can be received. The device 402 can receive a subsequent request 452 from a client device 450 to access a server 420 or remote computing device 420. The device 402 can determine if a client device 450 has previously requested access to the server 420 or remote computing device 420 and if a connection decision 432 for the server 420 or remote computing device 420 is cached in the database 430. In some embodiments, the device 402 can do a lookup, for example using an identifier or IP address of the server 420 or remote computing device 420 to determine if a connection decision 432 for the server 420 or remote computing device 420 is cached in the database 430.

If no connection decision 432 is cached for the requested server 420 (or remote computing device 420), the method 600 can go to (604) to initiate a first connection 442. If a connection decision 432 is cached for the requested server 420, the device 402 can verify a certificate 417 of the requested destination (e.g., verify same server SSL certificate) through communications with the requested server 420. The device 402 can compare the certificate 417 received with a previous certificate 417 and/or certificate data 417 stored in the database 430 with the cache decision 432 to verify if the server 420 is the same and/or still trustworthy or secure. In embodiments, if the certificates 417 match, the device 402 can apply the cached connection decision 432 to the subsequent request 452 and directly break out the connection 442 from the branch office 408 or backhaul the connection 442 though the data center 410 based on the cached connection decision 432. In embodiments, if the certificates 417 do not match, the device 402 can backhaul the connection 442 through the data center 410 for the subsequent connection 442 or make a new connection decision based in part on a current latency 416 of the possible connection paths and/or a security level of the possible connection paths (e.g., direct connection, back-hauled connections). In embodiments, if the certificates 417 do not match, the method 600 can go to (604) to initiate a first connection 442 and select at least one connection 442 to the requested server 420.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

We claim:
1. A method comprising:
 initiating, by a computing device, connections to a plurality of remote computing devices, the connections including one connection to a first remote computing device and another connection to a second remote computing device, and traffic via the another connection being controllable by application of at least one rule of a network security system;
 determining, by the computing device, a delay in an exchange of data via the connections, the determination of the delay in the exchange of data via the another connection being based in part on feedback about the application of the at least one rule;
 maintaining, by the computing device in a database, a plurality of connection decisions to the plurality of remote computing devices, each connection decision indicating a remote computing device, a certificate associated with the remote computing device and a selected connection; and
 connecting, by the computing device, a client device to one of the plurality of remote computing devices via at least one of the one connection or the another connection based at least in part on the determined delay in the exchange of data via the connections and the plurality of connection decisions previously made to the plurality of remote computing devices and maintained in the database.

2. The method of claim 1, wherein the at least one rule includes at least one of: a certificate, a firewall setting of the network security system, or a response to a handshake with the second remote computing device.

3. The method of claim 1, comprising:
 initiating, by the computing device, the another connection to the second remote computing device responsive to performing a handshake with the first remote computing device, the another connection having a sequence number associated with a sequence number of the one connection to the first remote computing device.

4. The method of claim 1, comprising:
 selecting, by the computing device responsive to a comparison of the delay in the exchange of data of the one connection to the delay in the exchange of data of the another connection, the one connection to the first remote computing device to connect the client device to the first remote computing device, wherein the another connection is rejected.

5. The method of claim 1, comprising:
comparing, by the computing device, a certificate communicated through the one connection to a certificate communicated through the another connection;
identifying, by the computing device responsive to a difference between certificates, an attack on the one connection; and
selecting, by the computing device, the another connection to connect the client device to the second remote computing device.

6. The method of claim 1, comprising:
selecting, by the computing device using the plurality of connection decisions, the one connection to the first remote computing device or the another connection to the second remote computing device for subsequent requests from one or more client devices to one or more remote computing devices of the plurality of remote computing devices.

7. The method of claim 1, comprising:
performing, by the computing device, a handshake with the second remote computing device through the another connection; and
rejecting, by the computing device responsive to the handshake through the another connection, the one connection to the first remote computing device.

8. A system comprising:
a computing device comprising one or more processors coupled to memory, the computing device configured to:
initiate connections to a plurality of remote computing devices, the connections including one connection to a first remote computing device and another connection to a second remote computing device, and traffic via the another connection being controllable by application of at least one rule of a network security system;
determine a delay in an exchange of data via the connections, the determination of the delay in the exchange of data via the another connection being based in part on feedback about the application of the at least one rule;
maintain, in a database, a plurality of connection decisions to the plurality of remote computing devices, each connection decision indicating a remote computing device, a certificate associated with the remote computing device and a selected connection; and
connect a client device to one of the plurality of remote computing devices via at least one of the one connection or the another connection based at least in part on the determined delay in the exchange of data via the connections and the plurality of connection decisions previously made to the plurality of remote computing devices and maintained in the database.

9. The system of claim 8, wherein the computing device is configured to:
initiate the another connection to the second remote computing device responsive to performing a handshake with the first remote computing device, the another connection having a sequence number associated with a sequence number of the one connection to the first remote computing device.

10. The system of claim 8, wherein the computing device is configured to:

select, responsive to a comparison of the delay in the exchange of data of the one connection to the delay in the exchange of data of the another connection, the one connection to the first remote computing device to connect the client device to the first remote computing device, wherein the another connection is rejected.

11. The system of claim 8, wherein the computing device is configured to:
identify a certificate communicated through the one connection matches a certificate communicated through the another connection; and
select, responsive to the match between certificates, the one connection to connect the client device to the first remote computing device.

12. The system of claim 8, wherein the computing device is configured to:
select, using the plurality of connection decisions, the one connection to the first remote computing device or the another connection to the second remote computing device for subsequent requests from one or more client devices to one or more remote computing devices of the plurality of remote computing devices.

13. A method, comprising:
initiating, by a computing device, connections to a plurality of remote computing devices, the connections including one connection to a first remote computing device and another connection to a second remote computing device, and traffic via the another connection being controllable by application of at least one rule of a network security system;
determining, by the computing device, a delay in an exchange of data via the connections, the determination of the delay in the exchange of data via the another connection being based in part on feedback about the application of the at least one rule;
identifying, by the computing device, a certificate communicated through the one connection matches a certificate communicated through the another connection;
selecting, by the computing device responsive to the match between certificates, the one connection to connect a client device to the first remote computing device; and
connecting, by the computing device, the client device to one of the plurality of remote computing devices via the one connection based at least in part on the match, the determined delay in the exchange of data via the connections, and a plurality of connection decisions previously made to the plurality of remote computing devices and maintained in a database.

14. A system, comprising:
a computing device comprising one or more processors coupled to memory, the computing device configured to:
initiate connections to a plurality of remote computing devices, the connections including one connection to a first remote computing device and another connection to a second remote computing device, and traffic via the another connection being controllable by application of at least one rule of a network security system;
determine a delay in an exchange of data via the connections, the determination of the delay in the exchange of data via the another connection being based in part on feedback about the application of the at least one rule;

compare a certificate communicated through the one connection to a certificate communicated through the another connection;
identify, responsive to a difference between certificates, an attack on the one connection;
select the another connection to connect a client device to the second remote computing device; and
connect the client device to one of the plurality of remote computing devices via the another connection based at least in part on the identified attack, the determined delay in the exchange of data via the connections, and a plurality of connection decisions previously made to the plurality of remote computing devices and maintained in a database.

* * * * *